US008767086B2

(12) United States Patent
Kuroiwa

(10) Patent No.: US 8,767,086 B2
(45) Date of Patent: Jul. 1, 2014

(54) IMAGE CAPTURING APPARATUS

(71) Applicant: Nikon Corporation, Tokyo (JP)

(72) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/791,439

(22) Filed: Mar. 8, 2013

(65) Prior Publication Data

US 2013/0194450 A1   Aug. 1, 2013

Related U.S. Application Data

(63) Continuation of application No. 12/314,664, filed on Dec. 15, 2008, now abandoned.

(30) Foreign Application Priority Data

Dec. 25, 2007 (JP) .................................. 2007-332281

(51) Int. Cl.
*H04N 5/232* (2006.01)
(52) U.S. Cl.
USPC .................................... 348/222.1; 348/220.1
(58) Field of Classification Search
USPC ....................................................... 348/222.1
See application file for complete search history.

(56) References Cited

U.S. PATENT DOCUMENTS

| 6,661,451 B1 * | 12/2003 | Kijima et al. ............... 348/220.1 |
| 7,433,099 B2 | 10/2008 | Kondo |
| 2003/0169346 A1 | 9/2003 | Ojima et al. |
| 2003/0206319 A1 | 11/2003 | Kondo |
| 2007/0268391 A1 * | 11/2007 | Kuroiwa .................. 348/333.01 |
| 2008/0062272 A1 | 3/2008 | Kuroiwa |
| 2008/0266410 A1 | 10/2008 | Fukuhara |

FOREIGN PATENT DOCUMENTS

| JP | A-2004-032713 | 1/2004 |
| JP | A-2004-135225 | 4/2004 |

OTHER PUBLICATIONS

May 15, 2012 Office Action issued in Japanese Patent Application No. 2007-332281 (w/translation).
Sep. 16, 2011 Office Action issued in U.S. Appl. No. 12/314,664.
Sep. 10, 2012 Office Action issued in U.S. Appl. No. 12/314,664.

* cited by examiner

*Primary Examiner* — Twyler Haskins
*Assistant Examiner* — Angel L Garces-Rivera
(74) *Attorney, Agent, or Firm* — Oliff PLC

(57) ABSTRACT

An image capturing apparatus can use a reading time from an image sensor efficiently. To achieve the object, the image capturing apparatus includes an image capturing unit which is configured to (i) capture image data (ii) separate the image data having a plurality of color components into a plurality of fields, and (iii) output each of the plurality of fields, the image-capturing unit being switchable between a first mode and a second mode, and a selecting unit which is configured to select two or more, but not all, of a plurality of fields, an image-generating unit which generates a low-resolution image based on image data of a field being selected by the selecting unit, and a controlling unit that is configured to cause the image-generating unit to generate the low-resolution image while the controlling unit outputs a field other than the field selected by the selecting unit.

10 Claims, 23 Drawing Sheets

FIG.2

| R | G | R | G |
|---|---|---|---|
| G | B | G | B |
| R | G | R | G |
| G | B | G | B |
| R | G | R | G |
| G | B | G | B |

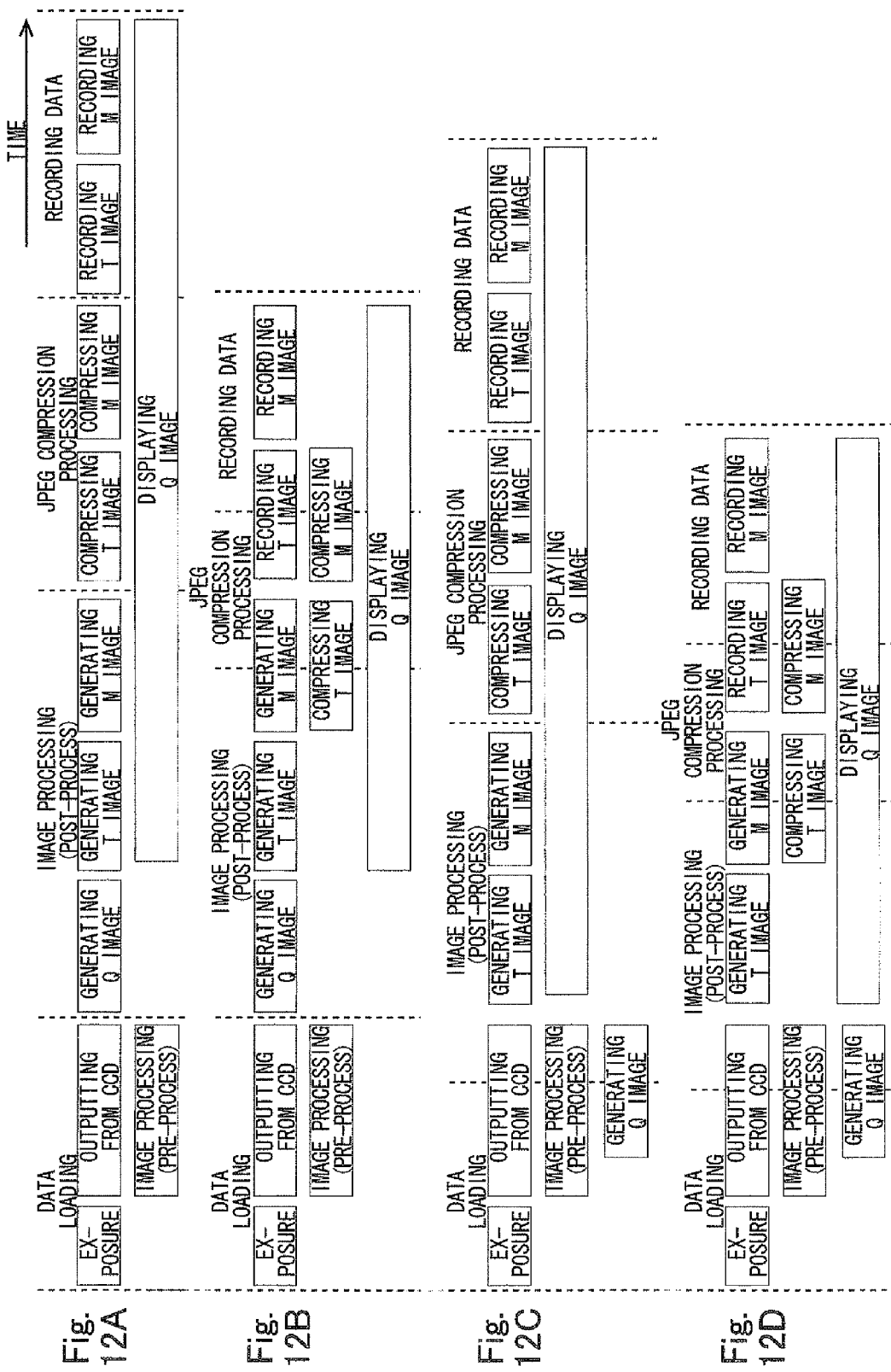

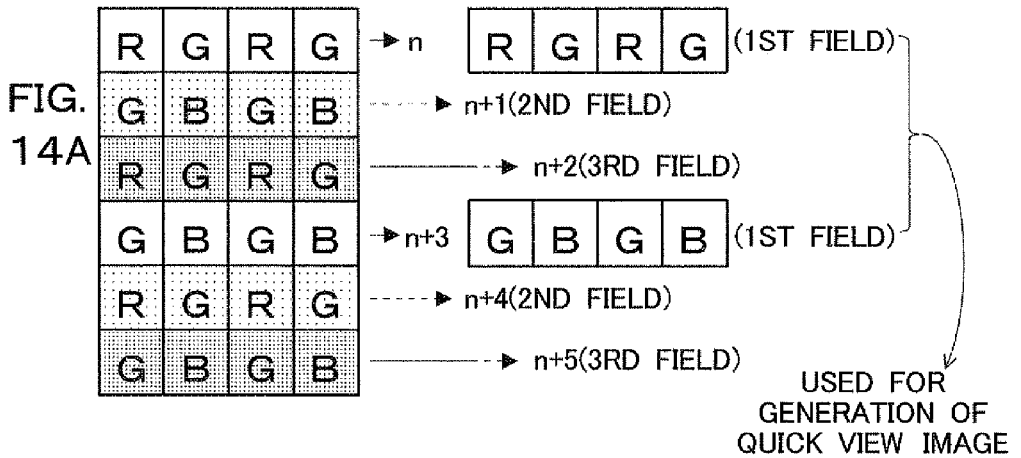
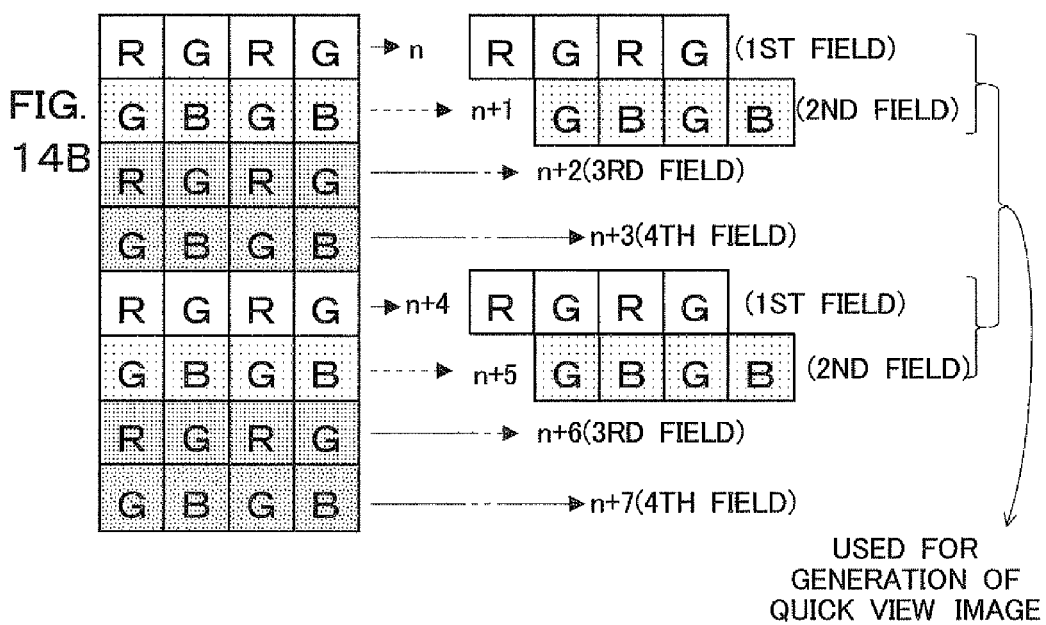

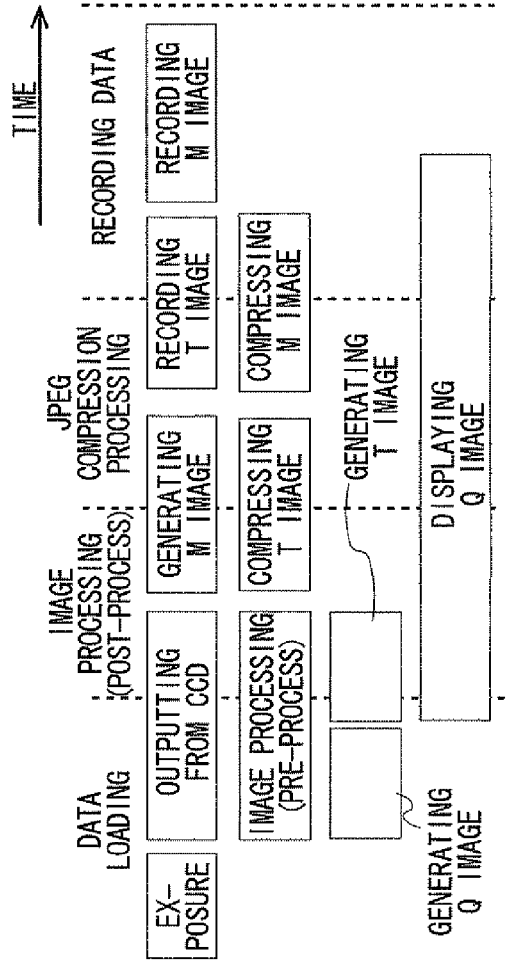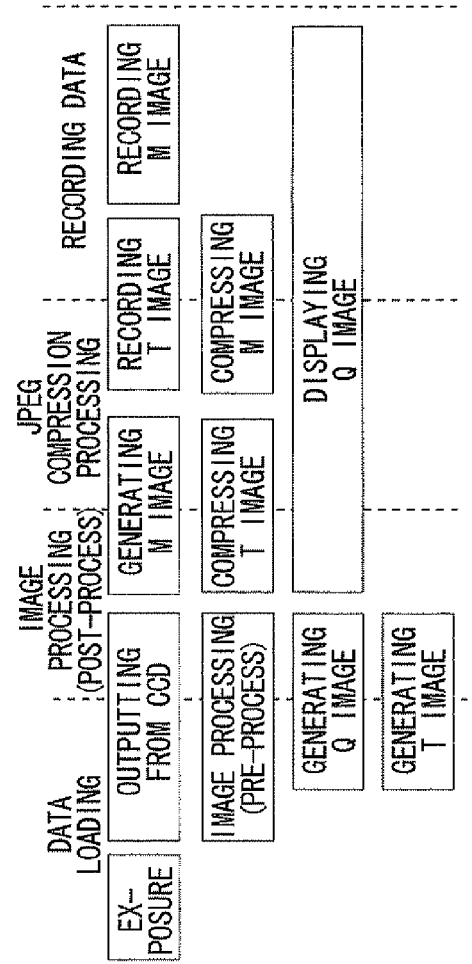

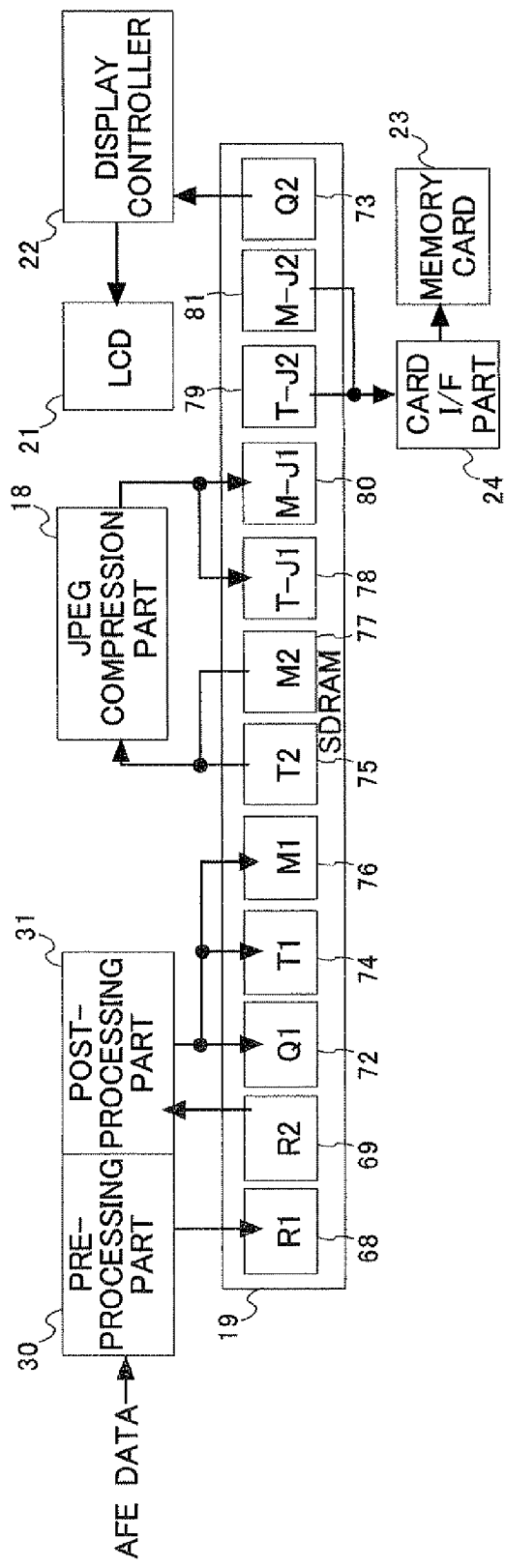

IMAGE CAPTURING APPARATUS

CROSS REFERENCE TO THE RELATED APPLICATIONS

This is a Continuation of application Ser. No. 12/314,664 filed Dec. 15, 2008, which in turn claims the benefit of priority from Japanese Patent Application No. 2007-332281, filed on Dec. 25, 2007, the entire contents of which are incorporated herein by reference. The disclosure of the prior applications are hereby incorporated by reference herein in its entirety.

BACKGROUND

1. Field

The present application relates to an image capturing apparatus which obtains an image by capturing an image of a subject.

2. Description of the Related Art

An electronic camera having an image sensor which separates a captured image of a subject into fields and reads the fields has been popularized. The applicant of the present invention has already proposed an electronic camera as an invention described in Japanese Unexamined Patent Application Publication No. 2004-135225. The proposed electronic camera can shorten the capturing interval by generating an image suited to be displayed on a display device for checking a captured result (hereinafter referred to as "quick view image") or an image suited for list display (hereinafter referred to as "thumbnail image") before completion of reading of all the fields.

The number of fields to be read however has increased with the recent advance of increase in the number of pixels used in the image sensor. For this reason, the time up to completion of reading of all the fields has become longer. As a result, the user's waiting time has become longer problematically.

SUMMARY

A proposition of the present embodiments is to use the reading time from an image sensor efficiently.

To achieve the proposition, the image capturing apparatus includes an image capturing unit which separates a color image of a subject being captured by an image sensor having pixels of colors into three or more fields and outputs said three or more fields successively, and an image processing unit which generates a low-resolution image which is lower in resolution than the color image obtained by the image capturing unit, based on output of one or more fields among said three or more fields, said one or more fields being able to extract color information of all the colors, wherein the image processing unit starts generation of the low-resolution image in a period in which fields other than said one or more fields for generating the low-resolution image are read.

Incidentally, the low-resolution image is an image for checking a result of capturing, and the image capturing apparatus may further include a display unit which displays the low-resolution image when the low-resolution image is generated by the image processing unit.

The image capturing apparatus may further include a field selecting unit which selects one field from the fields, wherein the image processing unit includes a pre-processing part which performs pre-processing on the color image output from the image capturing unit and a post-processing part which directly receives an output of the pre-processing part and performs post-processing on the pre-processed color image, and when the low-resolution image is to be generated, the color image of one field selected by the field selecting unit is directly transferred from the pre-processing part to the post-processing part to thereby perform the pre-processing and the post-processing integrally and sequentially.

The image processing unit may generate a first image lower in resolution and a second image lower in resolution, and the field selecting unit may select one field for generating the first image and one field for generating the second image, respectively.

The image processing unit may include a pre-processing part which performs pre-processing on the color image output from the image capturing unit, a post-processing part which performs post-processing on the pre-processed color image, and a pixel averaging part which directly receives an output of the post-processing part and averages any pixels of the post-processed color image, and when the low-resolution image is to be generated, a first low-resolution image is generated by the post-processing part and the generated first low-resolution image is directly transferred from the post-processing part to the pixel averaging part to thereby generate a second low-resolution image which is lower in resolution than the first low-resolution image simultaneously.

The image processing unit may include a white balance adjusting part, and when the low-resolution image is to be generated, the white balance adjusting part performs white balance adjustment in accordance with a white balance adjustment value decided in advance.

The image processing unit may include a pre-processing part which performs pre-processing on the color image output from the image capturing unit and a post-processing part which performs post-processing on the pre-processed color image, the image capturing apparatus may further include a plurality of buffer memory areas which store the color image pre-processed by the pre-processing part and a high-speed continuous capturing mode which performs, as parallel processing, a process of performing the pre-processing on the color image of one frame output from the image capturing unit and storing the pre-processed color image in one of the buffer memory areas and a process of performing the post-processing on the color image of a previous frame stored in another of the buffer memory areas, and the image processing unit does not start generation of the low-resolution image in a period of reading of fields other than said one or more fields for generating the low-resolution image while image capturing is executed in the high-speed continuous capturing mode.

BRIEF DESCRIPTION OF THE DRAWINGS

FIG. 2 is a view for explaining a Bayer arrangement.

FIGS. 12A to 12D are timing charts showing still image capturing sequences respectively.

FIGS. 14A and 14B are views for explaining generation of a quick view image.

FIGS. 18A and 18B are other timing charts showing still image capturing sequences respectively.

FIG. 23 is another diagram for explaining an image buffer of SDRAM 19.

DETAILED DESCRIPTION OF THE EMBODIMENTS

Embodiments of the present invention will be described below with reference to the drawings.

The configuration of an electronic camera 1 according to an embodiment will be described first with reference to FIG. 1.

Figure 1:
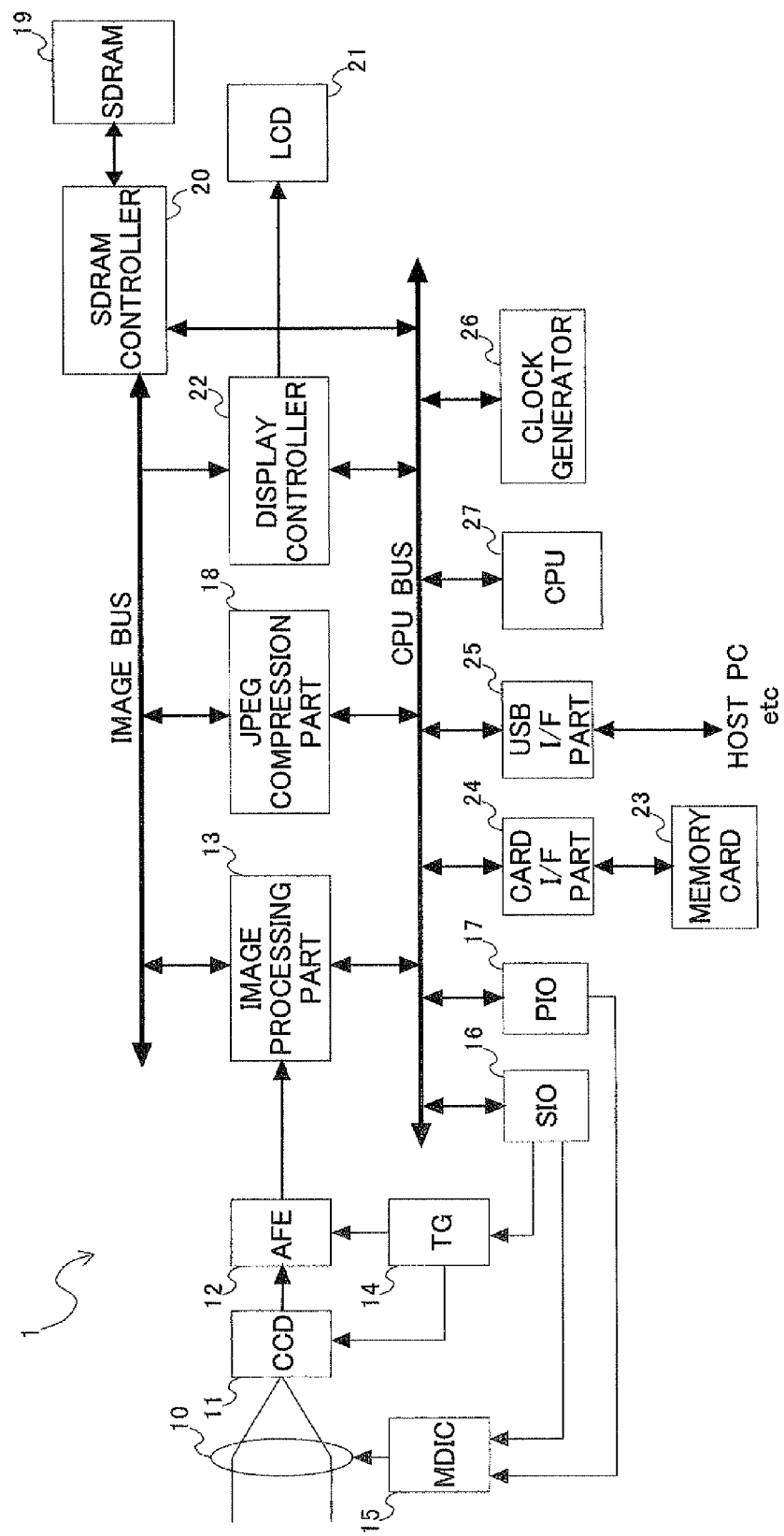
FIG. 1 is a block diagram showing the configuration of an electronic camera 1 according to an embodiment.
Figure 2:
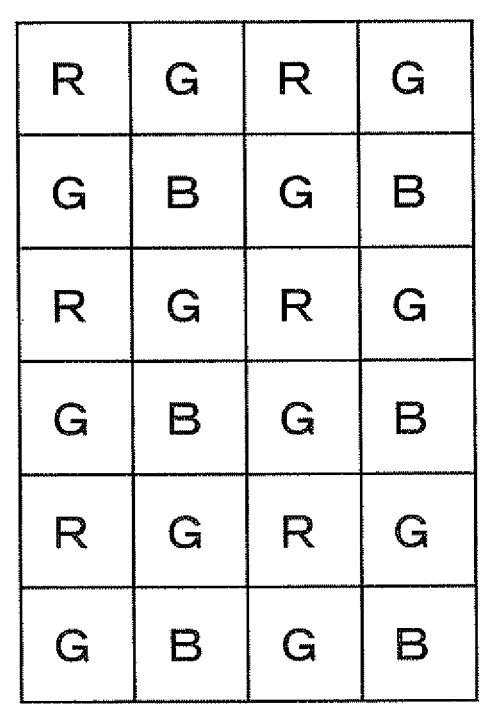

As shown in FIG. 1, the electronic camera 1 includes respective parts, i.e. an image-capturing lens 10, a CCD 11, an AFE (Analog Front End) 12, and an image processing part 13. The image-capturing lens 10 includes a focus lens, a zoom lens, a lens drive motor, etc. which are not shown. As shown in FIG. 2, the CCD 11 has a Bayer arrangement color filter. Incidentally, the CCD 11 is not limited to this example. The CCD 11 may have another filter arrangement such as a stripe arrangement or may be replaced with another image sensor than the CDD. An image of a subject captured by the CCD 11 through the image-capturing lens 10 is transformed into an image signal by the CCD 11. The image signal is output to the AFE 12. The output image signal is converted into digital data (hereinafter referred to as "image data") by the AFE 12. The image data is output to the image processing part 13.

The electronic camera 1 further includes respective parts, i.e. a TG (Timing Generator) 14, an MDIC (Motor Driver IC) 15, an SIO (Serial Input/Output) 16, and a PIO (Parallel Input/Output) 17. The TG 14 drives the CCD 11 and the AFE 12 to perform exposure, image signal output, etc. The MDIC 15 drives the lens drive motor of the image-capturing lens 10. The SIO 16 controls the TG 14 and the MDIC 15. The PIO 17 controls the MDIC 15.

The electronic camera 1 further includes respective parts, i.e. a JPEG compression part 18, an SDRAM 19, an SDRAM controller 20, an LCD 21, and a display controller 22. The JPEG compression part 18 compresses and expands image data subjected to image processing by the image processing part 13. The SDRAM 19 temporarily stores image data when the image data is subjected to image processing or image compression. The SDRAM controller 20 is an interface with the SDRAM 19. The LCD 21 displays image data and various kinds of information. The display controller 22 controls the LCD 21. Incidentally, the respective parts, i.e. the image processing part 13, the JPEG compression part 18, the SDRAM controller 20 and the display controller 22 are coupled to one another by an image bus.

The electronic camera 1 further includes respective parts, i.e. a memory card 23, a card I/F part 24, a USB I/F part 25 and a clock generator 26, and a CPU 27. The memory card 23 is removable and used for recording image data, etc. The card I/F part 24 is an interface with the memory card 23. The USB I/F part 25 can be coupled to a host PC, etc. The clock generator 26 supplies operating clocks to the respective parts. The CPU 27 controls the respective parts. Incidentally, the respective parts, i.e. the image processing part 13, the SIO 16, the PIO 17, the jPEG compression part 18, the SDRAM controller 20, the display controller 22, the card I/F part 24, the USB I/F part 25, the clock generator 26 and the CPU 27 are coupled to one another by a CPU bus.

Figure 3:
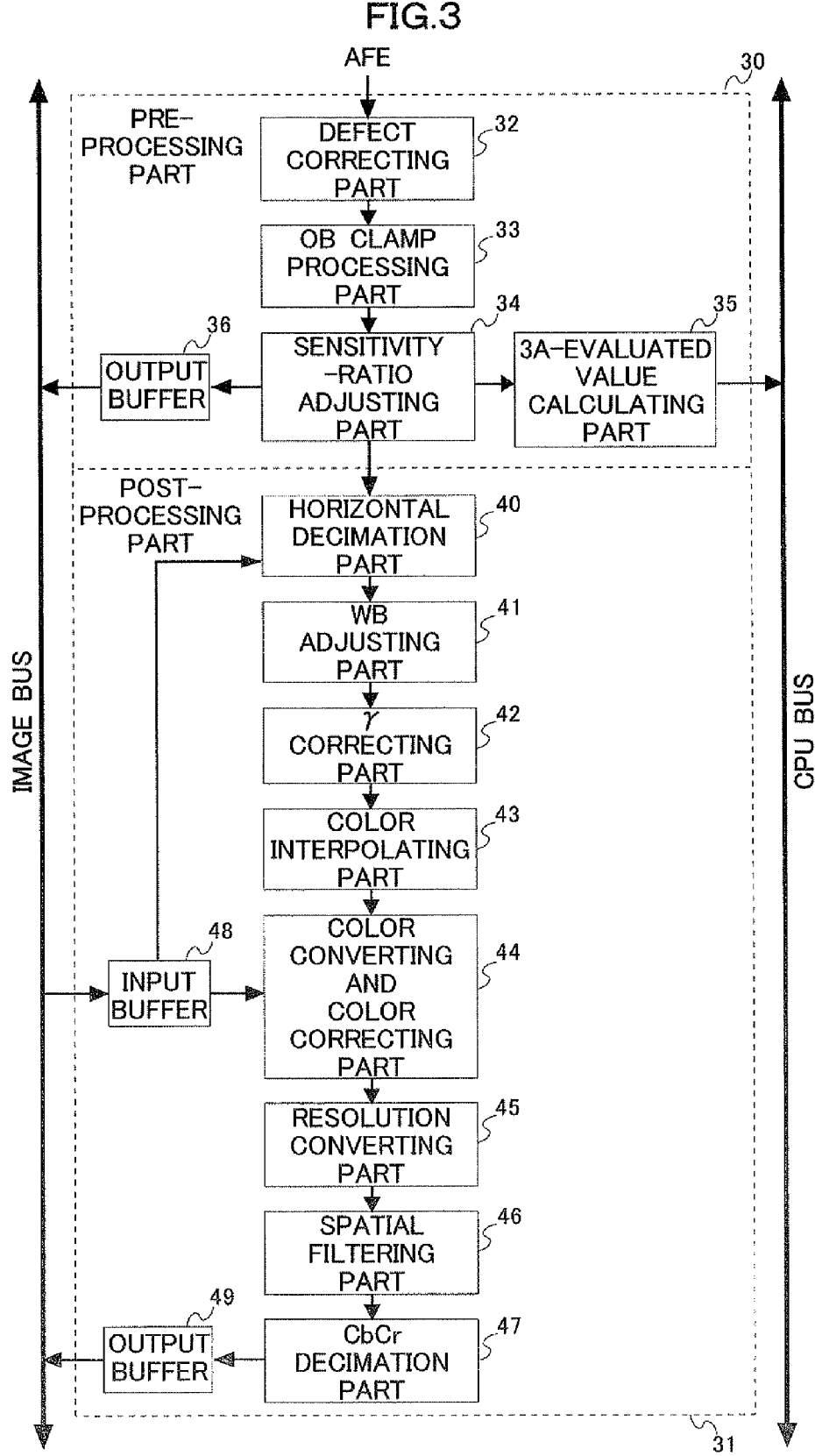
FIG. 3 is a block diagram showing the details of an image processing part 13.

FIG. 3 is a block diagram showing the details of the image processing part 13. As shown in FIG. 3, the image processing part 13 has a pre-processing part 30, and a post-processing part 31. The pre-processing part 30 has respective parts, i.e. a defect correcting part 32, an OB clamp processing part 33, a sensitivity-ratio adjusting part 34, a 3A-evaluated value calculating part 35, and an output buffer 36. The defect correcting part 32 applies defect pixel correction to image data input from the AFE 12. The OB clamp processing part 33 decides the black level of the image data corrected by the defect correcting part 32. The sensitivity-ratio adjusting part 34 corrects the signal levels of R, G and B by applying sensitivity ratio adjustment to the image data processed by the OB clamp processing part 33. The 3A-evaluated value calculating part 35 calculates respective evaluated values of AWB (Auto White Balance) in addition to the aforementioned AE and AF based on the output of the sensitivity-ratio adjusting part 34. Calculation results of the 3A-evaluated value calculating part 35 are output to the CPU 27 through the CPU bus. The output of the sensitivity-ratio adjusting part 34 is output to the post-processing part 31 and output to the image bus via the output buffer 36.

The post-processing part 31 has respective parts, i.e. a horizontal decimation part 40, a WB adjusting part 41, a γ correcting part 42, a color interpolating part 43, a color converting & color correcting part 44, a resolution converting part 45, a spatial filtering part 46, a CbCr decimation part 47, an input buffer 48, and an output buffer 49.

The horizontal decimation part 40 reduces the number of horizontal pixels by applying horizontal decimation to the image data pre-processed by the pre-processing part 30. The WB adjusting part 41 applies white balance adjustment to the image data decimated by the horizontal decimation part 40, based on the AWB evaluated value, etc. calculated by the 3A-evaluated value calculating part 35. They correcting part 42 applies γ correction to the image data white-balance-adjusted by the WB adjusting part 41. The color interpolating part 43 generates image data having three colors per pixel from Bayer arrangement image data having one color per pixel by applying color interpolation to the image data corrected by the γ correcting part 42. The color converting & color correcting part 44 generates image data in a target color space (e.g. sRGB) by applying color conversion and color correction to the image data interpolated by the color interpolating part 43. The image data is generally image data with YCbCr=4:4:4.

The resolution converting part 45 generates image data with a target size by applying a resolution conversion process to the image data corrected by the color converting & color correcting part 44. For example, for a view operation which will be described later, image data with a QVGA (320∴240)

size or a VGA (640×480) size is generated. The spatial filtering part 46 applies a spatial filtering process to the image data converted by the resolution converting part 45. Specifically, the spatial filtering part 46 applies an edge emphasizing process to a Y signal and applies a low-pass filtering process to color-difference signals (a Cb signal and a Cr signal). The CbCr decimation part 47 applies a decimation process to color-difference signals (a Cb signal and a Cr signal) to generate image data, for example, with YCbCr=4:2:2 and output the image data to the output buffer 49. The output of the output buffer 49 is coupled to the image bus. While the output from the image bus is coupled to the input buffer 48, the output of the input buffer 48 is coupled to the horizontal decimation part 40 and the color converting & color correcting part 44.

In the electronic camera 1 having the aforementioned configuration, there are a view operation and a still image capturing operation as capturing operations. The view operation is an operation of generating and displaying a through image to check a composition in real time. The still image capturing operation is an operation of generating an image (hereinafter referred to as "main image") by main image capturing.

Figure 4:
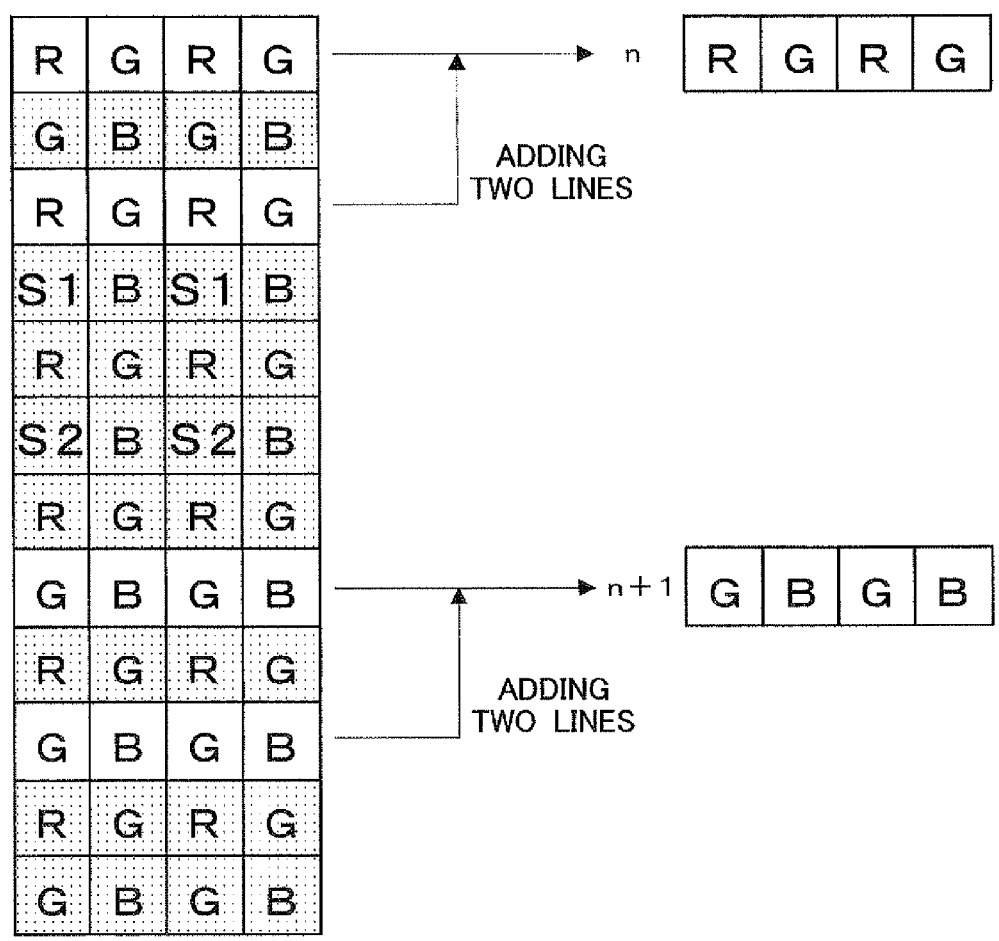
FIG. 4 is a view for explaining a view operation.

In the view operation, a high frame rate (e.g. 30 fps) is obtained because a decimated image signal is output from the CCD 11 as shown in FIG. 4. The view operation is suited for real-time observation of a subject on the LCD 21, photometric measurement for AE (Auto Exposure) or execution of AF (Auto Focusing).

Figure 5:
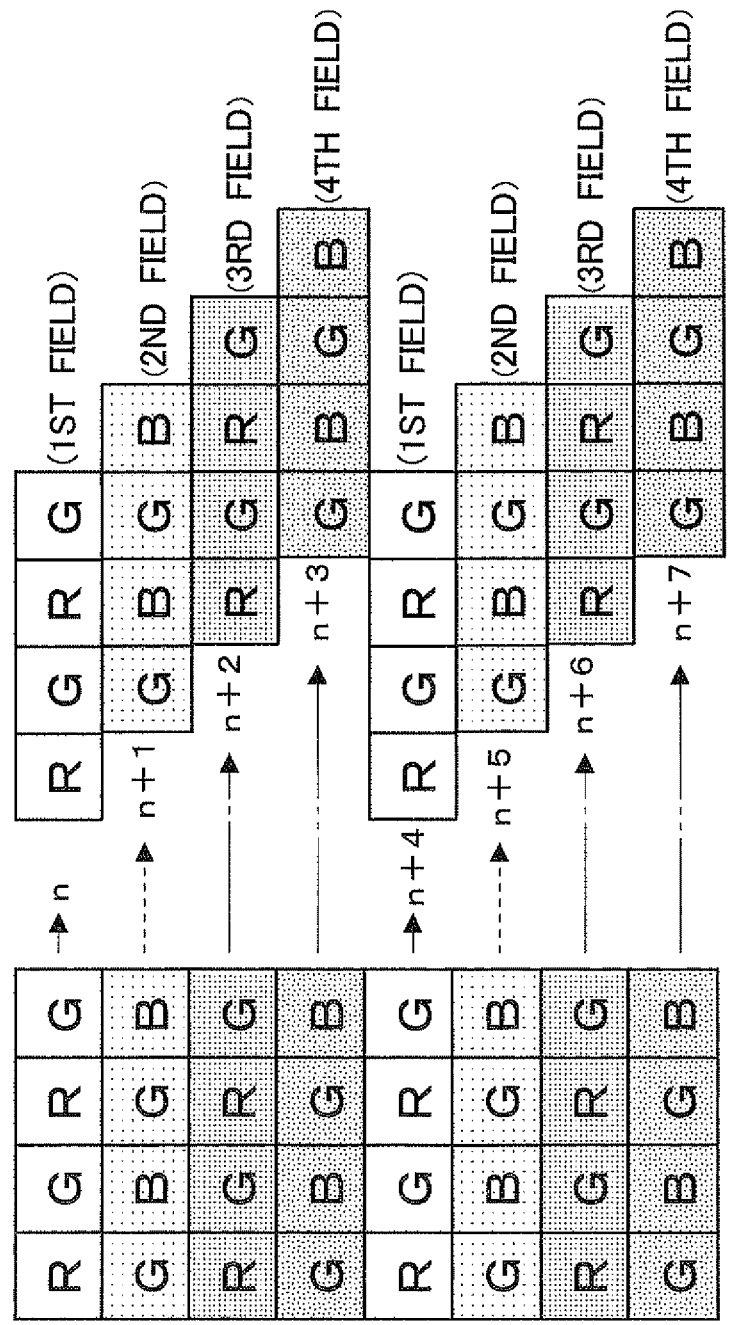
FIG. 5 is a view for explaining a still image capturing operation.

On the other hand, in the still image capturing operation, an image signal with all pixels is output from the CCD 11 as shown in FIG. 5. Accordingly, the image signal is high in resolution and is output in the condition that the image signal is separated into a plurality of fields. Although FIG. 5 shows an example where 4 fields are output, the number of fields has a tendency toward increase with the advance of increase in number of pixels used in the CCD 11.

In the aforementioned view operation, post-processing due to the post-processing part 31 can be directly applied to the image data pre-processed by the pre-processing part 30 because adjacent lines of an image signal are output sequentially from the CCD 11 as shown in FIG. 4. That is, in the view operation, the pre-processing part 30 inputs the pre-processed image data to the post-processing part 31 directly. Then, the image data post-processed by the post-processing part 31 is temporarily stored in the SDRAM 19 via the image bus and the SDRAM controller 20. Further, the image data from the SDRAM 19 passes through the SDRAM controller 20, the image bus and the display controller 22 successively and is displayed as a through image on the LCD 21.

On the other hand, in the aforementioned still image capturing operation, an interpolating process or the like in the post-processing due to the post-processing part 31 cannot be executed because the image signal is output from the CCD 11 in the condition that the image signal is separated into a plurality of fields as shown in FIG. 5. For example, in a first field shown in FIG. 5, a line n+4 is output next to a line n. Since lines n+1, n+2 and n+3 are inserted between the lines n and n+4, a process such as color interpolation, resolution conversion or spatial filtering using adjacent lines of image data cannot be applied to image data of the first field. In the aforementioned still image capturing operation, therefore, image data of the fields are pre-processed by the pre-processing part 30 respectively, temporarily stored in the SDRAM 19 and combined into a frame image on the SDRAM 19 and then post-processed by the post-processing part 31.

Figure 6:
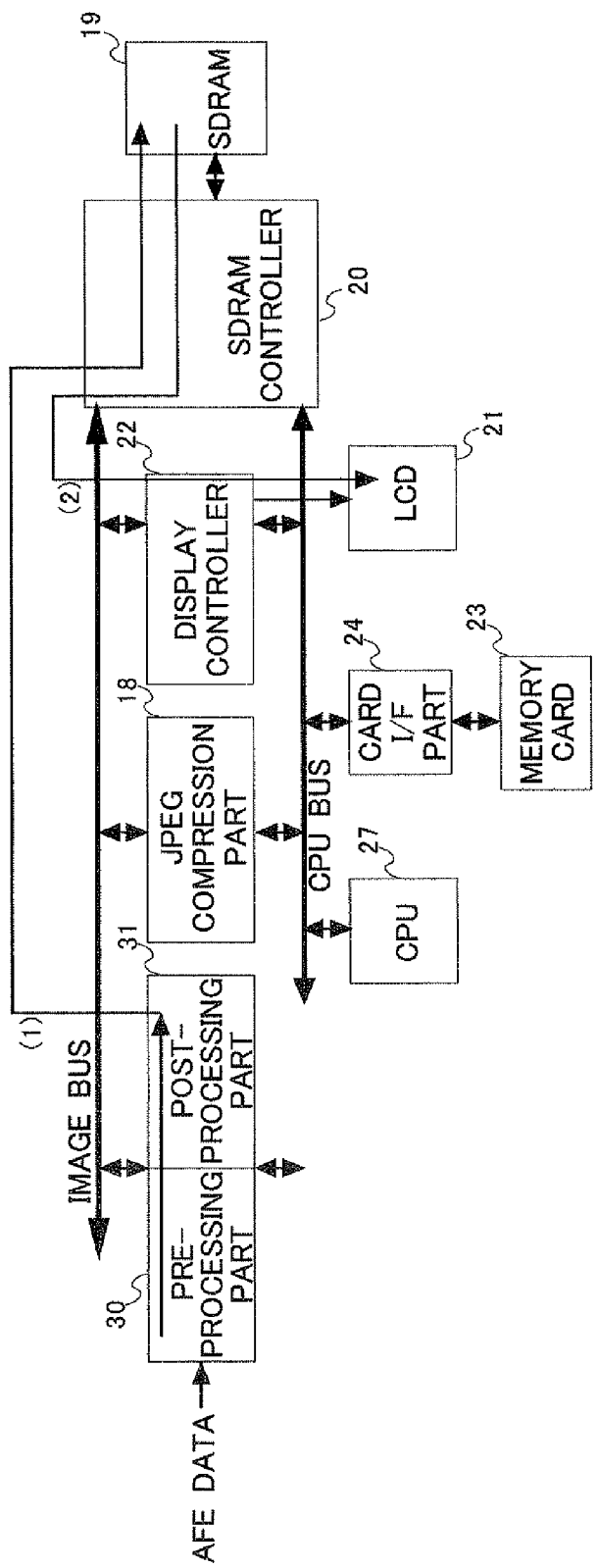
FIG. 6 is a flow of image data during the view operation.
Figure 7:
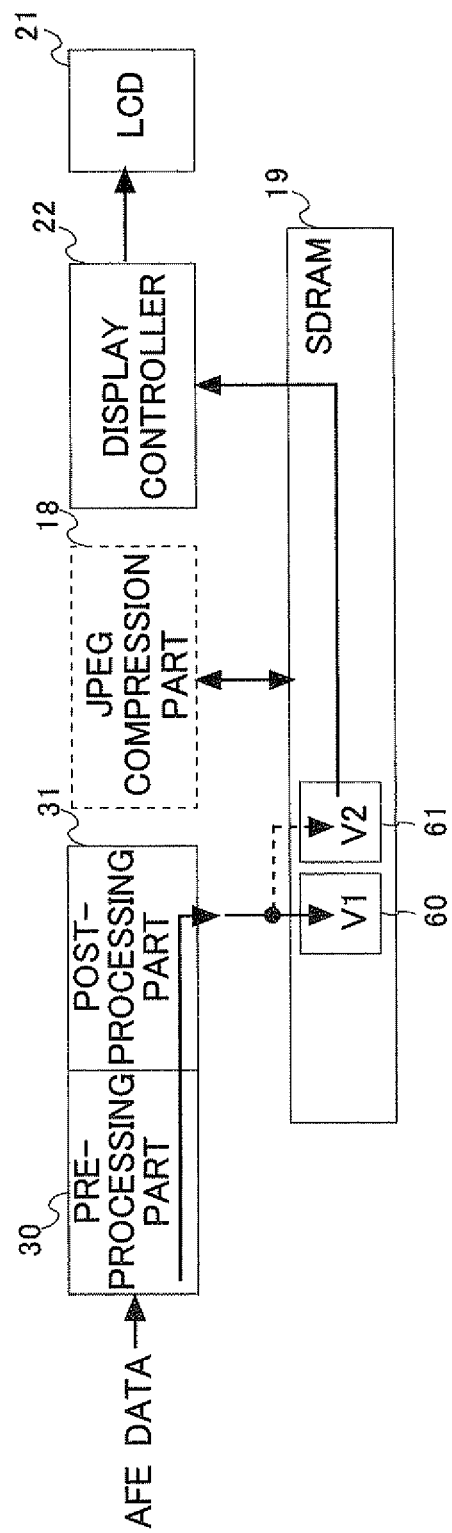
FIG. 7 is a diagram for explaining an image buffer of an SDRAM 19.

FIG. 6 shows a flow of image data during the view operation. The CPU 27 performs image processing along an arrow (1) and displays a through image along an arrow (2). Incidentally, in order to display the through image continuously, the two image buffers of a V1 buffer 60 and a V2 buffer 61 as shown in FIG. 7 are prepared so that the two image buffers are switched alternately every frame. When a release button is half-pushed, the CPU 27 performs AE operation using an AE evaluated value and AF using an AF evaluated value based on the 3A-evaluated value calculating part 35 in preparation for the still image capturing operation. When the release button is full-pushed after it is half-pushed, the CPU 27 performs exposure for still image capturing based on a result of the aforementioned AE operation after completion of AF and goes to the still image capturing operation.

The exposure for still image capturing is terminated by the closure of a mechanical shutter not shown, so that an image signal separated into a plurality of fields as shown in FIG. 5 is output from the CCD 11. While image data of each field is pre-processed by the pre-processing part 30 and then stored in the SDRAM 19, the CPU 27 calculates an AWB evaluated value in the 3A-evaluated value calculating part 35 in accordance with each field. When all the pre-processed image data of the fields are stored in the SDRAM 19, the CPU 27 sets a WB adjustment value obtained from the aforementioned AWB evaluated values in the WB adjusting part 41. Then, the CPU 27 reads image data stored in the SDRAM 19 in (progressive) order of lines so that the image data is post-processed by the post-processing part 31.

Figure 8:
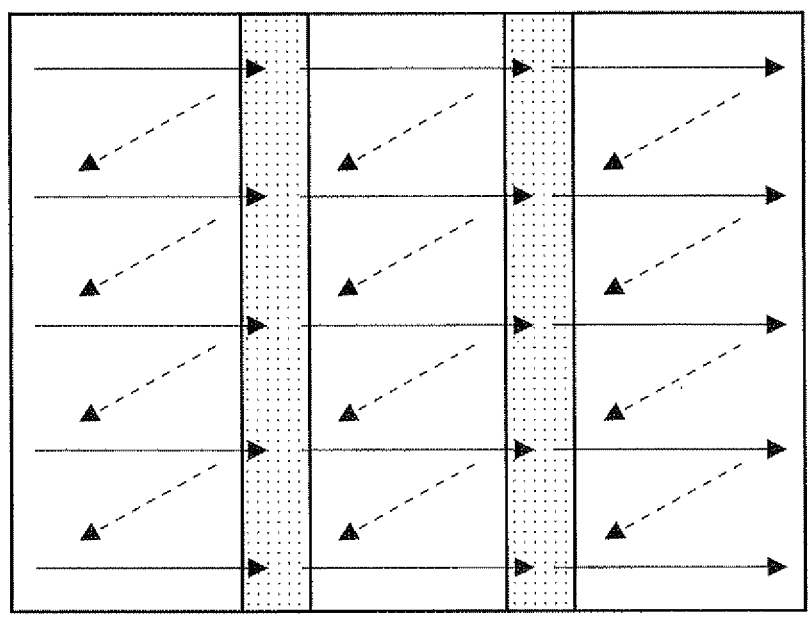
FIG. 8 is a view for explaining generation of a main image.

Incidentally, the three images of a quick view image for checking capturing, a thumbnail image suited for list display and a main image are generated in the still picture capturing. These images are generated by post-processing the pre-processed image data respectively. The size of the main image is so large that the main image cannot be usually generated by one post-process. Therefore, as shown in FIG. 8, the main image is generated in such a manner that pre-processed image data is separated into narrow strip blocks, each of the blocks is post-processed, and the post-processed blocks are combined. However, the size of each post-processed block is reduced because surrounding pixels are cut off. Therefore, as shown in FIG. 8, boundary portions of adjacent blocks are made to overlap with each other so that post-processed images are combined correctly. Incidentally, when the main image is to be generated, the horizontal decimation part 40 is generally bypassed so that full-resolution pixels are fed to the post-stage. On the other hand, the size of each of the quick view image and the thumbnail image is small so that each of the quick view image and the thumbnail image can be generated by one post-process (without separation into strip blocks as described with reference to FIG. 8) if it has been initially subjected to horizontal decimation.

Figure 9:
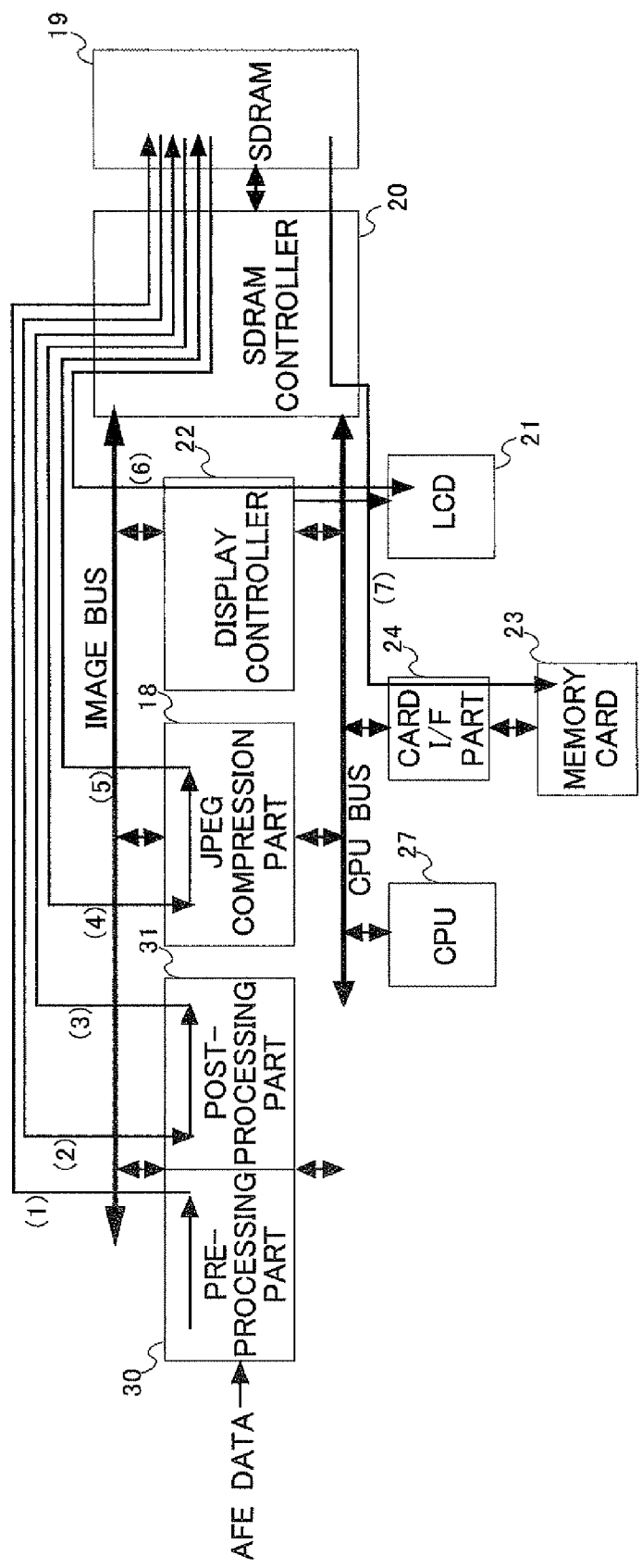
FIG. 9 is a flow of image data during the still image capturing operation.

A still picture capturing operation according to the related art will be described first for the sake of comparison. FIG. 9 shows a flow of image data during the still image capturing operation. The CPU 27 performs pre-processing along an arrow (1) and performs post-processing along arrows (2) and (3). Each of the pre-processing part 30 and the post-processing part 31 has one image processing pipeline. Accordingly, each of the quick view image, the thumbnail image and the main image is generated sequentially. Each of the three images is stored in the SDRAM 19. Incidentally, it is preferable that the quick view image is generated first so that the user can check the contents of the captured main image quickly. It is preferable that the thumbnail image is then generated and the main image is finally generated. This is because a general file format standard called Exif/DCF uses data arrangement that the thumbnail image is recorded on a header portion of a JPEG file and the main image is recorded on a tail portion of the JPEG file. The CPU 27 displays image data of the quick view image on the LCD 21 along an arrow (6).

The CPU 27 further records the thumbnail image and the main image both in a JPEG compressed format. The CPU 27 performs JPEG compression along arrows (4) and (5). Because one part is provided as the JPEG compression part 18, compression of the thumbnail image and compression of the main image are performed sequentially. In this case, it is preferable that the thumbnail image and the main image are compressed in this order. The CPU 27 combines compressed data of the thumbnail image and compressed data of the main image into one file on the SDRAM 19 in accordance with the Exif/DCF format and records the file on the memory card 23 through the card I/F part 24 along an arrow (7).

Figure 10:
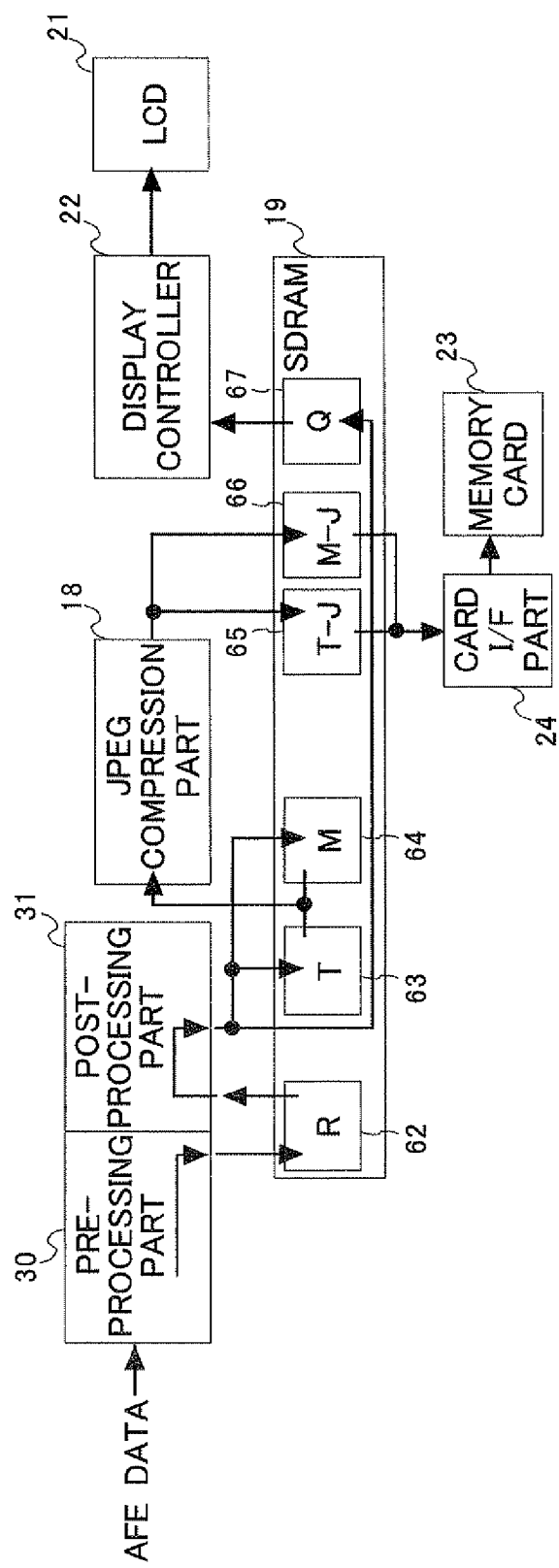
FIG. 10 is another diagram for explaining an image buffer of the SDRAM 19.

As described above, a plurality of data flows appear during the still image capturing operation. Therefore, a plurality of image buffers are prepared in the SDRAM 19 correspondingly to the data flows. As shown in FIG. 10, the SDRAM 19 has respective image buffers, i.e. an R buffer 62, a T buffer 63, an M buffer 64, a T-J buffer 65, an M-J buffer 66, and a Q buffer 67.

As shown in FIG. 10, the CPU 27 stores pre-processed image data in the R buffer 62. The image data stored in the R buffer 62 is post-processed so that image data of the thumbnail image thus generated is stored in the T buffer 63. The image data stored in the R buffer 62 is post-processed so that image data of the main image thus generated is stored in the M buffer 64. The image data stored in the T buffer 63 is JPEG-compressed by the JPEG compression part 18 so that image data of the compressed image thus generated is stored in the T-J buffer 65. The image data stored in the M buffer 64 is JPEG-compressed by the JPEG compression part 18 so that image data of the compressed image thus generated is stored in the M-J buffer 66. The image data stored in the T-J buffer 65 and the image data stored in the M-J buffer 66 are combined into one file on one SDRAM 19 as described above, so that the file is recorded on the memory card 23. In addition, the image data stored in the R buffer 62 is post-processed so that image data of the quick view image thus generated is stored in the Q buffer 67. The image data stored in the Q buffer 67 is displayed on the LCD 21 through the display controller 22 as described above.

Figure 11:
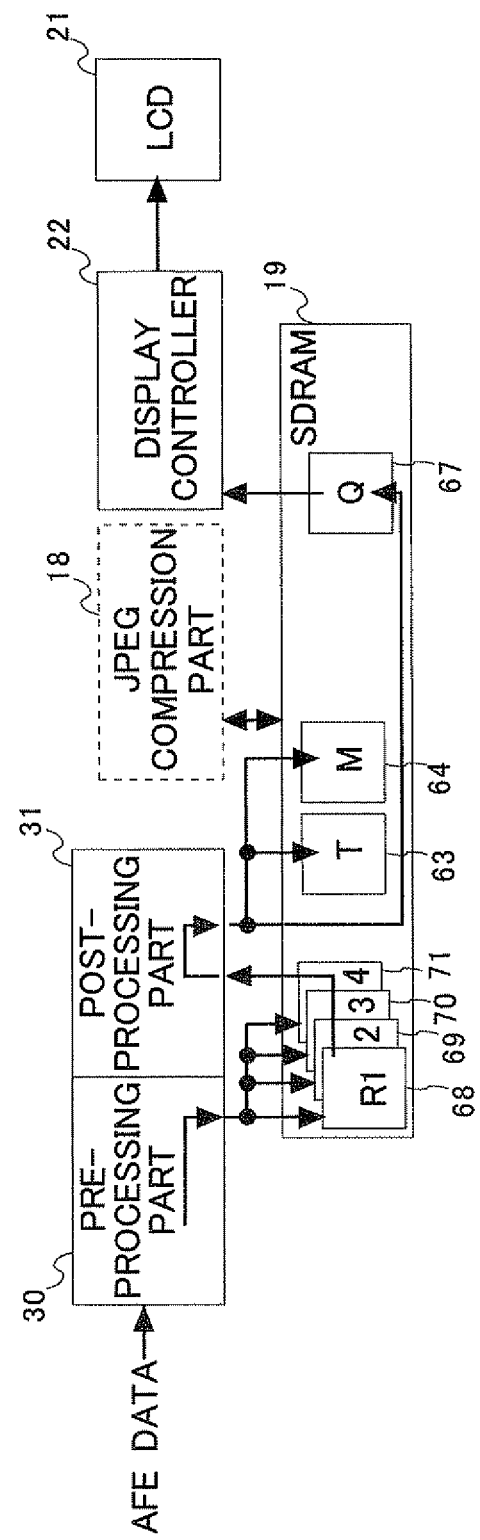
FIG. 11 is another diagram for explaining an image buffer of the SDRAM 19.

Although the data flow reaching the R buffer 62 is drawn as one line in FIG. 10, a plurality of data flows as shown in FIG. 11 are actually provided because image data separated into fields as shown in FIG. 5 are input to the R buffer 62 successively. As shown in FIG. 11, the SDRAM 19 has respective image buffers, i.e. an R1 buffer 68, an R2 buffer 69, an R3 buffer 70 and an R4 buffer 71 in place of the R buffer 62 shown in FIG. 10. These image buffers may be configured so that the R buffers (R1 to R4) 62 of respective fields have discrete addresses so that a one-frame image can be read in (progressive) order of lines regardless of the number of original fields. Image data of the fourth field is input to the R4 buffer. The CPU 27 starts post-processing due to the post-processing part 31 after all image data of the four fields are stored in the image buffers respectively.

FIG. 12A is a timing chart showing a sequence for capturing a still image as described above. In FIG. 12A, "Q image", "T image" and "M image" express a quick view image, a thumbnail image and a main image respectively. As shown in FIG. 12A, outputting of an image signal from the CCD 11 and pre-processing due to the pre-processing part 30 are performed in parallel so that image data of fields subjected to pre-processing are stored in the R buffers (the R1 buffer 68 to the R4 buffer 71) successively. When image data of all the fields are stored in the R buffers, post-processing due to the post-processing part 31 is applied to the image data to generate the three images of a quick view image, a thumbnail image and a main image successively. Incidentally, the CPU 27 displays the quick view image on the LCD 21 immediately after the CPU 27 generates the quick view image. Then, the CPU 27 applies JPEG compression due to the JPEG compression part 18 to the thumbnail image and the main image successively. Finally, the CPU 27 records compressed data of the thumbnail image and compressed data of the main image on the memory card 23 successively.

Incidentally, the thumbnail image and the main image are generated successively and JPEG-compressed successively. Therefore, when the thumbnail image is JPEG-compressed during generation of the main image, and compressed data of the thumbnail image is recorded during JPEG compression of the main image as shown in FIG. 12B, a plurality of processes can be executed while overlapping with one another so that the total processing time (capturing time) can be shortened. Further, when odd fields are read from the CCD 11, a low-resolution color image such as a quick view image or a thumbnail image can be generated from image data of only one field in parallel with outputting of an image signal from the CCD 11 as described above in the Related Art (see FIG. 12C).

FIG. 12D is a timing chart showing a high-speed still image capturing sequence obtained by combination of FIG. 12B and FIG. 12C. As shown in FIG. 12D, generation of a quick view image from image data of only one field is performed in parallel with outputting of an image signal from the CCD 11. Further, JPEG compression of a thumbnail image is started in the middle of generation of a main image. As a result, there is a large merit that the quick view image and the thumbnail image can be generated earlier.

Figure 13A:
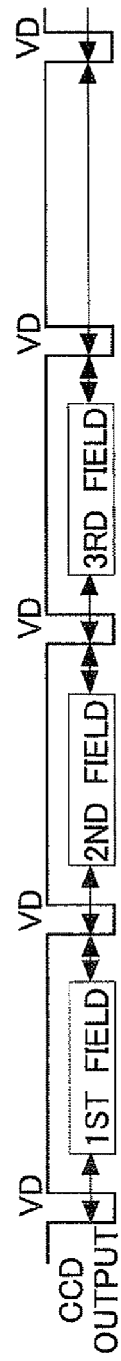
FIGS. 13A and 13B are timing charts of an image signal output of a CCD 11 during the still image capturing operation.

Further, an example in which generation of only a quick view image is performed in parallel with outputting of an image signal from the CCD 11 is shown in FIGS. 12C and 12D. However, if the CCD 11 is of a 3-field output type, an image signal of the three fields is output successively in synchronization with a vertical synchronizing signal (VD signal) from the TG 14 as shown in FIG. 13A. Accordingly, when a quick view image is generated during reading of the first or second field and a thumbnail image is generated during reading of the second or third field, the generation of the quick view image and the thumbnail image can be completed before the outputting of the image signal of all the fields from the CCD 11 is completed.

Incidentally, as described above, the time required for completion of reading of all the fields from the CCD has become longer with the advance of increase in number of fields to be read. Therefore, in this invention, generation of the quick view image and the thumbnail image is started earlier in order to use the reading time efficiently.

FIGS. 14A and 14B are views for explaining generation of a quick view image in this embodiment. FIG. 14A shows an example where the CCD 11 is of a 3-field output type. FIG. 14B shows an example where the CCD 11 is of a 4-field output type. When the CCD 11 is of a 3-field output type, one field contains all color signal components (R, G and B) as shown in FIG. 14A. Accordingly, a quick view image and a thumbnail image can be generated from image data of only one field (the first field in the example shown in FIG. 14A). On the other hand, when the CCD 11 is of a 4-field output type, each field lacks one color signal component as shown in FIG. 14B. For example, the first field does not contain any B signal, and the second field does not contain any R signal. Therefore, in such a case, a quick view image and a thumbnail image are generated from image data of two fields (the first and second fields in the example shown in FIG. 14B) from which all color information can be extracted. Although all color information can be extracted from the image signal of two fields in the example shown in FIG. 14B, a smallest number of fields allowed to extract all color information may be properly used for a CCD etc. using color filters containing three or more color components.

Figure 13B:
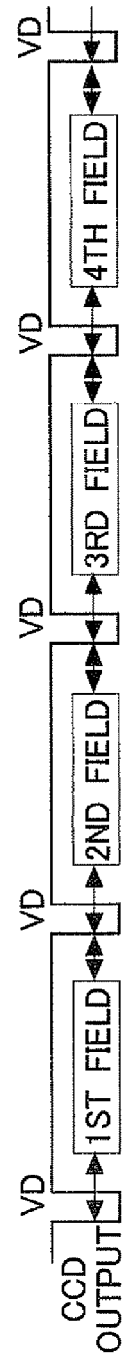

For example, as shown in FIG. 13B, when the CCD 11 is of a 4-field output type, a quick view image and a thumbnail image can be generated from image data of the first and second fields without waiting for completion of outputting of an image signal of all the fields from the CCD 11, at the point of time of completion of outputting of an image signal of the second field. Accordingly, the period of reading of the third and fourth fields can be used efficiently.

On this occasion, it is preferable that generation of the quick view image has priority over generation of the thumbnail image. This is because the user can check capturing based on the quick view image earlier while the quick view image can be used for generating the thumbnail image. In comparison between an image obtained by combining the first and second fields and a quick view image generated from the image, the size (resolution) of the quick view image is generally smaller (lower). Accordingly, when the quick view image is generated first and used for generating the thumbnail image, processing can be accelerated.

Figure 15:
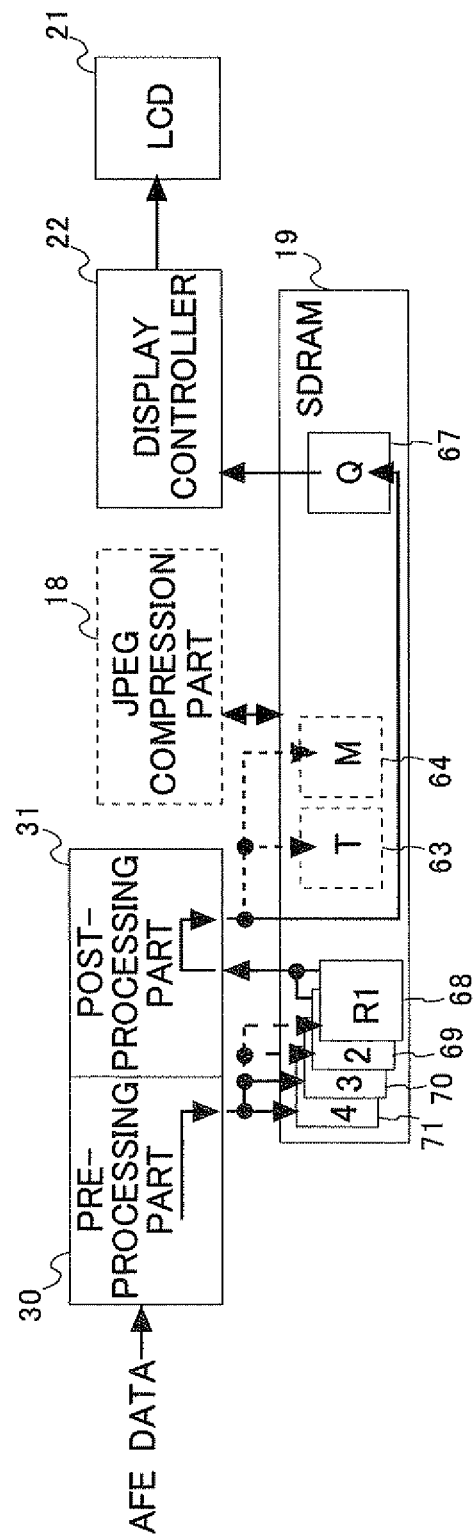
FIG. 15 is a flow of data during generation of a quick view image.

FIG. 15 shows a flow of data during generation of a quick view image. As shown in FIG. 15, the CPU 27 reads image data of the first and second fields stored in the SDRAM 19 (the R1 buffer 68 and the R2 buffer 69) while storing image data of the third and fourth fields in the SDRAM 19 (the R3 buffer 70 and the R4 buffer 71). Then, the read image data of the first and second fields are post-processed by the post-processing part 31 to generate a quick view image.

Figure 16:
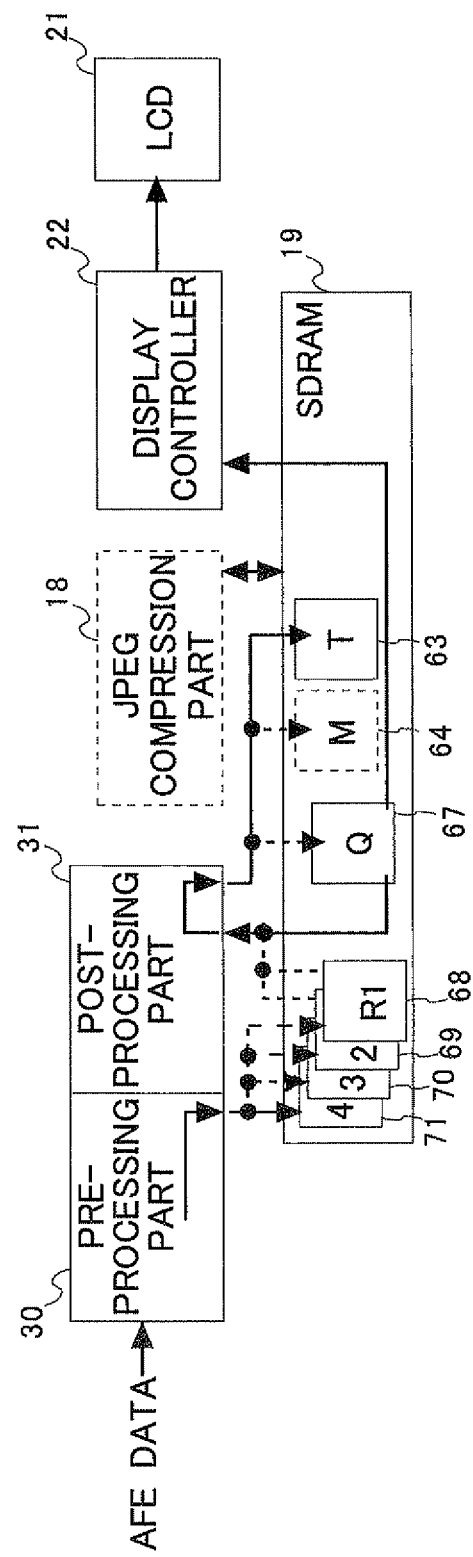
FIG. 16 is a flow of data during generation of a thumbnail image.

FIG. 16 shows a flow of data during generation of a thumbnail image from the quick view image generated by the data flow of FIG. 15. As shown in FIG. 16, the CPU 27 reads image data of the quick view image stored in the SDRAM 19 (the Q buffer 67) and applies a reduction process, etc. due to the resolution converting part 45 of the post-processing part 31 to the read image data of the quick view image to thereby generate a thumbnail image.

As described above with reference to FIGS. 15 and 16, even when the quick view image and the thumbnail image are generated sequentially, the total processing time can be shortened. When, for example, the total reading time of the third and fourth fields is required for generating the quick view image, the whole processing is performed in the same timing as in FIG. 12C or 12D. When the quick view image is generated in a shorter time, the total processing time can be further shortened because generation of the thumbnail image can be executed ahead of schedule. For example, this can be achieved when the frequency of processing clocks concerned with the post-processing part 31 is set at a high frequency. When generation of the quick view image is completed at an early timing of the reading period of the fourth field, generation of the thumbnail image can be completed before an end of the reading period of the fourth field. In this case, generation of the thumbnail image from the quick view image as described above with reference to FIG. 16 is effective.

On the other hand, as described above with reference to FIG. 13A, when the CCD 11 is of a 3-field output type, a quick view image and a thumbnail image can be generated from image data of only the first field. Accordingly, the reading period of the second and third fields can be used efficiently. In this case, as described above with reference to FIG. 15, the CPU 27 reads image data of the first field stored in the SDRAM 19 (the R1 buffer 68) and applies post-processing due to the post-processing part 31 to the read image data of the first field to generate a quick view image and a thumbnail image.

Figure 17:
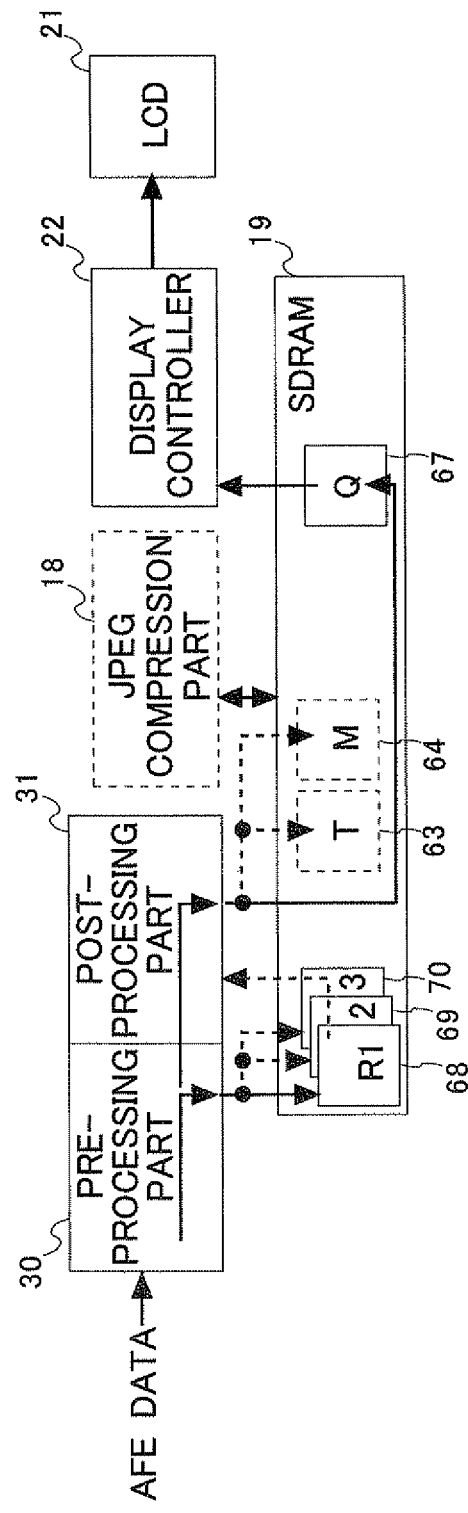
FIG. 17 is another flow of data during generation of a quick view image and a thumbnail image.

As described above with reference to FIG. 14A, when one filed contains all color signal components (R, G and B), generation of a quick view image and a thumbnail image by a data flow shown in FIG. 17 can make processing more efficient. That is, as shown in FIG. 17, the CPU 27 transfers image data of one field pre-processed by the pre-processing part 30 from the pre-processing part 30 to the post-processing part 31 directly. Then, the image data is post-processed by the post-processing part 31 to generate a quick view image. The quick view image is stored in the SDRAM 19 (the Q buffer 67).

The same processing as in the data flow during the view operation shown in FIGS. 6 and 7 can be made to transfer image data from the pre-processing part 30 to the post-processing part 31 directly. A plurality of quick view images are however generated when image data is simply transferred from the pre-processing part 30 to the post-processing part 31 directly. A field selecting unit for selecting one of the fields is therefore provided so that image data of only one field set by the field selecting unit in advance can be directly transferred to the post-processing part 31 to thereby generate one quick view image. According to this configuration, the image processing part 13 performs control automatically (without necessity of the CPU 27's controlling the operation/suspension of the post-processing part 31) to operate the post-processing part 31 in the reading period of only one selected field but suspend the post-processing part 31 in the reading period of the other fields.

Because a reduction process is generally performed when a quick view image is generated, the horizontal decimation part 40 can be used efficiently in the same manner as in the view operation described above with reference to FIGS. 6 and 7. On the other hand, image data of all the fields pre-processed by the pre-processing part 30 must be stored in the SDRAM 19 so that a high-resolution main image can be generated afterward. As shown in FIG. 17, there are hence provided two data flows corresponding to the quick view image output from the post-processing part 31 and the image data output from the pre-processing part 30.

According to the configuration described with reference to FIG. 17, it is possible to expect a merit of generating the quick view image in real time and a merit of reducing data traffic on the SDRAM 19. For example, if generation of the quick view image is completed in the reading period of the first field in FIG. 13A, two reading periods of the second and third fields are free sufficiently to generate the thumbnail image. In this case, the thumbnail image can be generated from the quick view image as described above with reference to FIG. 16. When the thumbnail image is generated from the quick view image, completion of generation of the thumbnail image in the reading period of the second field can be achieved. That is, the processing time can be shortened as shown in a timing chart of FIG. 18A. When the processing clock is further adjusted appropriately, processing such as starting or terminating compression of the thumbnail image in the reading period of the third field can be performed further ahead of schedule.

Instead of generation of the thumbnail image from the quick view image as described above with reference to FIG. 16, there may be used a method in which the quick view image is generated from the image data of the first field in the reading period of the first field and the thumbnail image is then generated from the image data of the second field in the reading period of the second field. In this case, the field used for generating the quick view image and the field used for generating the thumbnail image can be set respectively by the aforementioned selection unit. According to this configuration, the processing time can be shortened at the same level as that in the case where the thumbnail image is generated from the quick view image.

Alternatively, configuration may be made so that the quick view image and the thumbnail image are generated simultaneously in parallel. In most cases, the size of the quick view image is a QVGA (320×240) size or a VGA (640×480) size. On the other hand, the size of the thumbnail image is defined as a standard (160×120) size in the Exif/DCF format. It is found from size comparison between the quick view image and the thumbnail image that the standard thumbnail image (160×120) in the Exif/DCF format can be generated if the size of the quick view image is reduced to "1/N" times (in which N is an integer). It is a matter of course that this good compatibility is effective in the case where the thumbnail image is generated from the quick view image as described above with reference to FIG. 16. On the other hand, the size reduction process is equivalent to a process of calculating an average of pixel values in a block "N pixels" (horizontal) by "N pixels" (vertical). Therefore, a bit shift technique which is a known technique can be used for generating the quick view image and the thumbnail image simultaneously in parallel. Specifically, 2 bits are shifted to the right for "¼" times (N=4) and 1 bit is shifted to the right for "½" times (N=2). Because such a circuit for calculating an average of pixels has a very simple structure, increase in cost and power consumption caused by the provision of this circuit is allowable.

Figure 19:
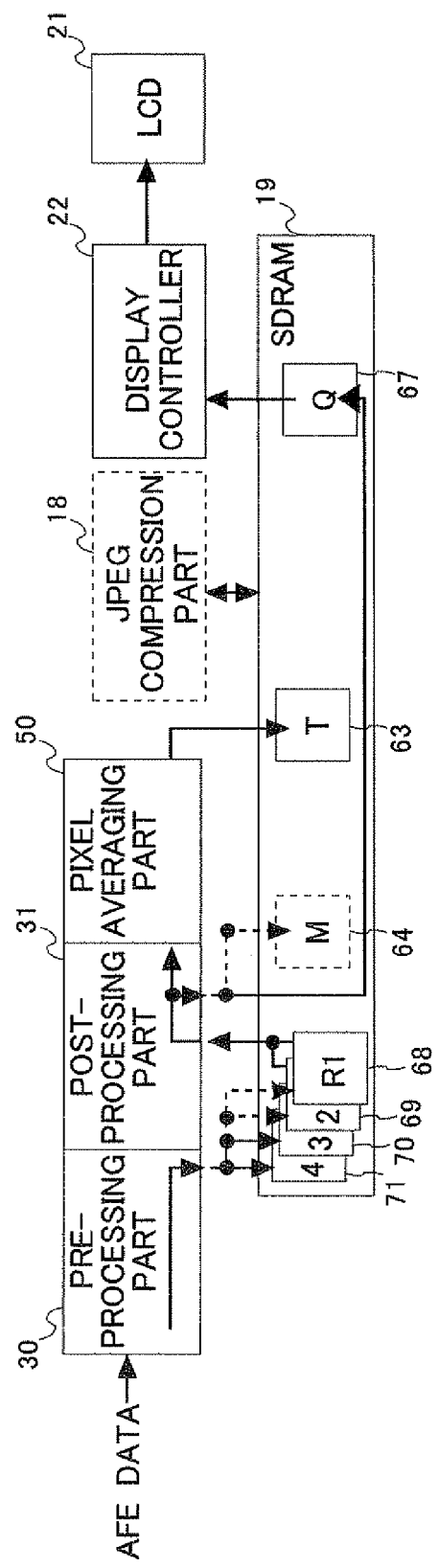
FIG. 19 is another flow of data during generation of a quick view image and a thumbnail image.

Therefore, as shown in a data flow of FIG. 19, a pixel averaging part 50 is provided in the rear of the post-processing part 31. Post-processed image data is input from the post-processing part 31 to the pixel averaging part 50 directly. FIG. 19 shows an example where the CCD 11 is of a 4-field output type. When the quick view image has been generated in the post-processing part 31, the pixel averaging part 50 calculates an average of pixel values in a block 4 pixels (horizontal) by 4 pixels (vertical) (16 pixels in total) in the quick view image (i.e. increases an integrated value of 16 pixels by 1/16 times (4-bit shift)) or calculates an average of pixel values in a block 2 pixels (horizontal) by 2 pixels (vertical) in the quick view image (4 pixels in total) (i.e. increase an integrated value of 4 pixels by ¼ times (2-bit shift)). Then, the pixel averaging part 50 outputs the average as the value of one pixel of the thumbnail image.

Then, the CPU 27 stores image data of the quick view image generated by the post-processing part 31 in the SDRAM 19 (the Q buffer 67) and stores image data of the thumbnail image generated by the pixel averaging part 50 in the SDRAM 19 (the T buffer 63). That is, the processing time can be shortened as shown in a timing chart of FIG. 18B.

Although the averaging process executed by the pixel averaging part 50 is effective for generating the quick view image from image data of one field, the averaging process is particularly effective for generating the quick view image from image data of two or more fields. The start of generation of the quick view image from image data of two or more fields is always delayed compared with the start of generation of the quick view image from image data of one field. The delay can be however compensated when the quick view image and the thumbnail image are generated simultaneously as described above. For example, when the CCD 11 is of a 4-field output type, generation of the quick view image can be started at the point of time of completion of outputting of the image signal of the second field and generation of the thumbnail image can be started at the same time as described above with reference to FIG. 13B. Accordingly, both the quick view image and the thumbnail image can be generated before the reading period of all the fields is terminated.

To further improve the processing speed for generating the quick view image from image data of two or more fields, image data reduced for the quick view image in advance (i.e. low-resolution RAW data) may be stored in the SDRAM 19. That is, as shown in a data flow of FIG. 20, while image data of all fields pre-processed by the pre-processing part 30 are stored in the SDRAM 19 (the R1 buffer 68 to the R4 buffer 71), image data of fields used for generating the quick view image are transferred from the pre-processing part 30 to the post-processing part 31 directly, size-reduced by the post-processing part 31 and stored in the SDRAM 19 (a Q-R1 buffer 82 and a Q-R2 buffer 83). In this case, a reduction ratio for the size reduction process in the horizontal decimation part 40 in the post-processing part 31 is set so that an image slightly larger than the quick view image can be obtained.

Then, the horizontally size-reduced image data of the first and second fields are stored in the SDRAM 19 (the Q-R1 buffer 82 and the Q-R2 buffer 83) via the output buffer 49. Therefore, configuration is made so that the output of the horizontal decimation part 40 can be connected to the output buffer 49. Although the horizontal size reduction permits the quick view image to be generated at a high speed, combination of the horizontal size reduction and vertical size reduction permits the quick view image to be generated at a higher speed when the total number of first and second field lines is considerably larger than the number of lines in the quick view image (e.g. when the total number of first and second field lines is larger than twice as large as the number of lines in the quick view image).

Figure 20:
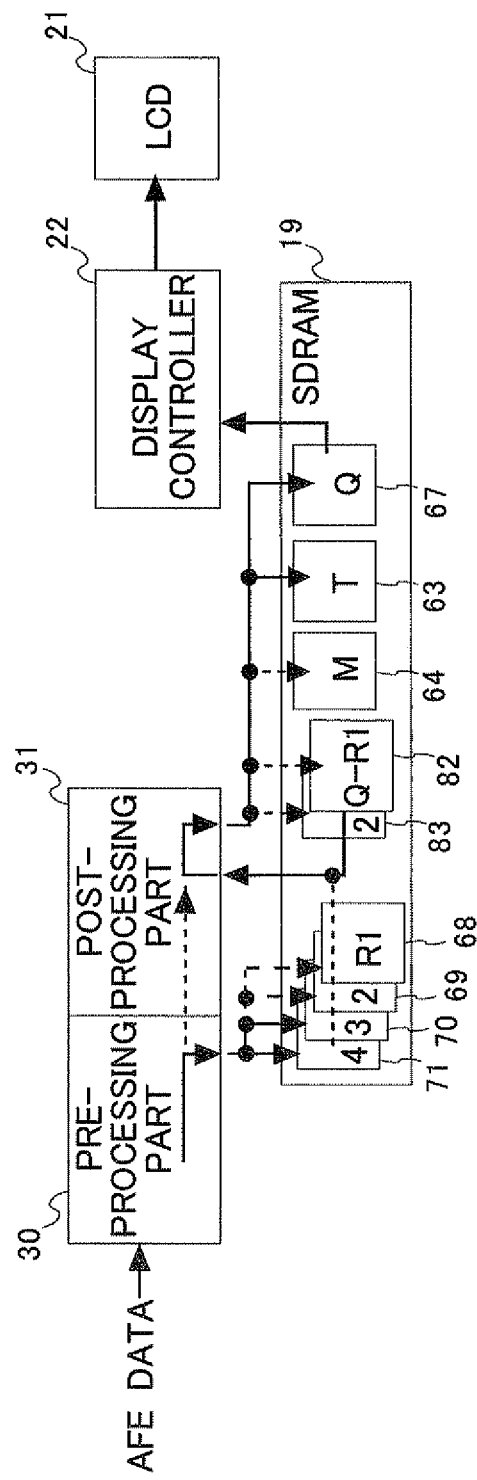
FIG. 20 is another flow of data during generation of a quick view image and a thumbnail image.

The data stored in the Q-R1 and Q-R2 buffers 82 and 83 in FIG. 20 are Bayer arrangement image data. The color arrangement in one field is however common to all the lines as described above with reference to FIG. 14B. Accordingly, even when, for example, the lines added up in FIG. 14B are first field lines n and n+4 or second field lines n+1 and n+5, the color arrangement is unchanged. That is, this is the same as the case where two lines are added up as described in the view operation in FIG. 4. Accordingly, the aforementioned vertical size reduction can be achieved by use of line averaging (addition and division). A line memory is however required when the line averaging is performed by both addition and division. That is, image data of one line horizontally size-reduced by the horizontal decimation part 40 is stored in the line memory so that vertical size reduction can be performed by calculation of an average (addition and division due to bit shift) of the image data and image data of the next line horizontally size-reduced in the same manner as described above.

Generally, the time required for image processing is proportional to the size of an image which is a subject of image processing. Therefore, the processing time can be shortened when the quick view image is generated from the low-resolution RAW data (reduced Bayer arrangement image data) as described above with reference to FIG. 20. Incidentally, if it is difficult to provide the aforementioned line memory, the quick view image can be generated at a high speed because even horizontal size reduction executed by the horizontal decimation part 40 can dispense with the separation of image data into strip blocks as shown in FIG. 8 in addition to reduction in number of horizontal pixels.

Figure 21:
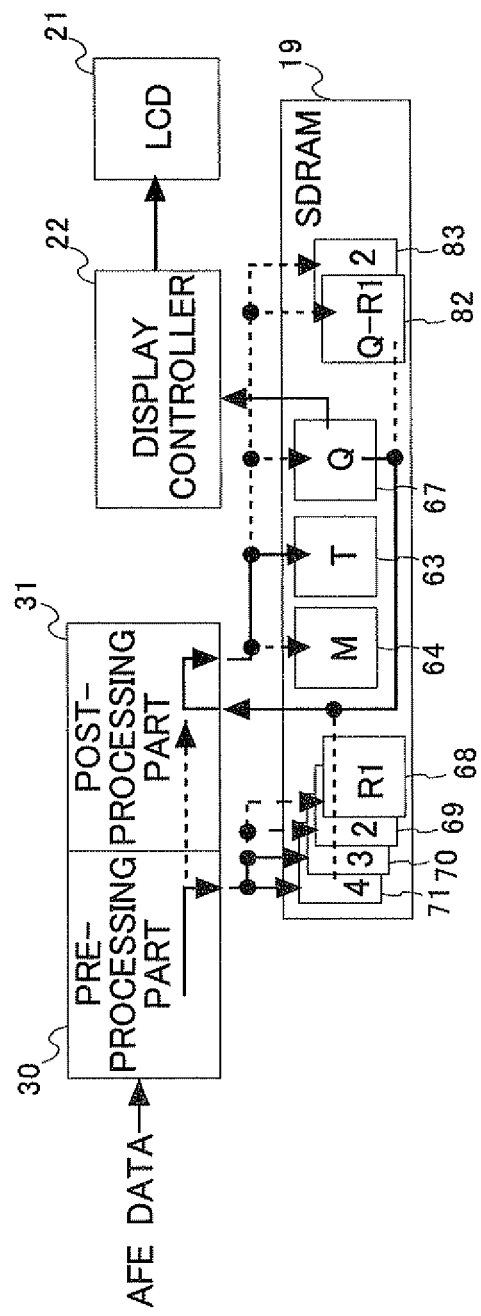
FIG. 21 is another flow of data during generation of a quick view image and a thumbnail image.

A data flow shown in FIG. 21 which is a modification of FIG. 20 is effective likewise. That is, as shown in FIG. 21, a quick view image is generated first and then a thumbnail image is generated from the quick view image. In this case, the processing time becomes longer than that in the data flow shown in FIG. 20. Elongation of the processing time can be however suppressed because the thumbnail image is generated from the quick view image. In addition, increase of hardware can be suppressed because it is unnecessary to provide any new structure such as a pixel averaging circuit.

Alternatively, the following measures may be taken in consideration of accuracy in white balance adjustment executed by the WB adjusting part 41 of the post-processing part 31. As described above with reference to FIG. 3, it is necessary to set an appropriate WB adjustment value in the WB adjusting part 41 when image data is post-processed by the post-processing part 31. White balance adjustment is an adjusting process for reproducing an appropriate color by correcting change of the color temperature of illuminating light on a subject when the color temperature changes. For the white balance adjustment, the CPU 27 sets the WB adjusting part 41 at the WB adjustment value obtained from the AWB evaluated value calculated by the 3A-evaluated value calculating part 35 as described above with reference to FIG. 3. In the view operation in which a through image is displayed on the LCD 21, the AWB evaluated value is updated at a constant rate (e.g. at a rate of 30 fps) in accordance with new image data which is continuously input to the pre-processing part 30. Generally, it is unnecessary to change the WB adjustment value frequently because the color temperature of illuminating light does not change rapidly. Accordingly, in the view operation, the WB adjustment value can be updated at a moderate rate.

On the other hand, in the still image capturing operation in which a still image is generated, the WB adjustment value is obtained based on the AWB evaluated value generally extracted from image data per se of the still image because the still image is an independent image of one frame. However, if the WB adjustment value is obtained based on the AWB evaluated value extracted from image data per se of a quick view image or a thumbnail image to be generated, generation of the quick view image or the thumbnail image is delayed. It is therefore preferable that the WB adjustment value used for generating the quick view image or the thumbnail image is decided in advance. For example, the WB adjustment value may be the latest WB adjustment value used in the view operation just before or may be obtained, as a WB adjustment value corresponding to the color temperature of illuminating light, from a database in the electronic camera 1 if the color temperature of illuminating light can be found in advance (e.g. as in flash photography). Then, the CPU 27 performs white balance adjustment due to the WB adjusting part 41 in accordance with the WB adjustment value decided in advance.

However, if the WB adjustment value can be calculated based on the AWB evaluated value at a high speed, the WB adjustment value may be obtained based on the AWB evaluated value extracted from image data per se of the quick view image or the thumbnail image to be generated. For example, when the CCD 11 is of a 3-field output type as described above with reference to FIG. 13A, an AWB evaluated value is extracted from image data of the first field in the reading period of the first field, a WB adjustment value is calculated based on the AWB evaluated value extracted in the reading period of the first field, in the reading period of the second field, and a quick view image is finally generated in the reading period of the third field. Because it is conceived that there is a high correlation between the respective fields, there is no large problem when the quick view image is generated from image data of the third field based on the AWB evaluated value extracted in the reading period of the first field.

On the other hand, for example, when the CCD 11 is of a 4-field output type as described above with reference to FIG. 13B, an AWB evaluated value is extracted from image data of the first and second fields in the reading period of the first and second fields, a WB adjustment value is calculated based on the AWB evaluated value extracted in the reading period of the first and second fields, in the reading period of the third field, and a quick view image and a thumbnail image are generated in the reading period of the fourth field. Incidentally, when a long time is required for calculating the WB adjustment value, the WB adjustment value may be calculated in the reading period of the third and fourth fields so that the quick view image and the thumbnail image can be generated simultaneously after final reading of the fourth field is completed. Although the quick view image and the thumbnail image cannot be generated in the period of reading of an image signal from the CCD 11, the total processing time can be shortened because the WB adjustment value can be calculated ahead of schedule. In this case, processing may be made in accordance with the data flow described with reference to FIG. 20.

Figure 22:
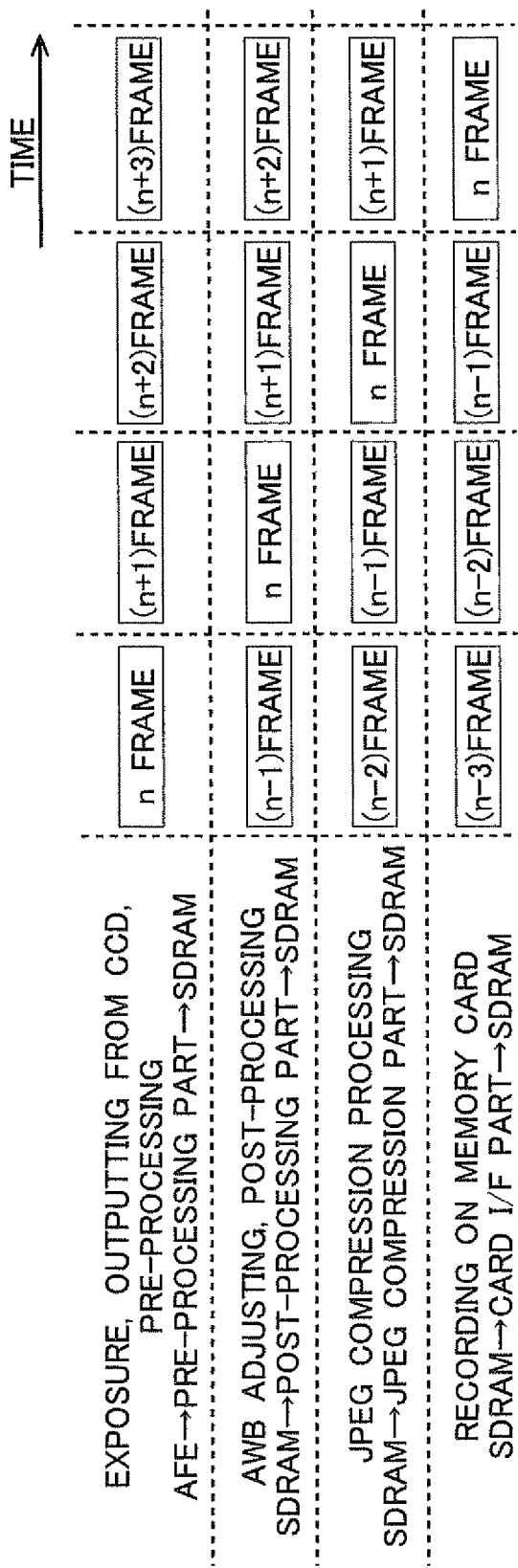
FIG. 22 is a view for explaining a high-speed continuous image capturing mode.

Exceptional processing will be described below when the electronic camera 1 has a high-speed continuous capturing mode. As shown in FIG. 22, the high-speed continuous capturing mode is a capturing mode where capturing of one frame of the latest still image is made in parallel with image processing (post-processing) of a previous frame, in parallel with JPEG compression of a further previous frame and in parallel with recording of a further previous frame. In the high-speed continuous capturing mode, the three images of a quick view image, a thumbnail image and a main image are generated in image processing (post-processing), the thumbnail image and the main image are compressed in JPEG compression processing, and compressed data of the thumbnail image and the main image are recorded in recording processing. That is, in each step, images are processed in parallel.

It is necessary to provide a plurality of image buffers so that the four steps shown in FIG. 22 can overlap with one another. For example, as shown in FIG. 23, an R1 buffer 68 and an R2 buffer 69 are provided in place of the R buffer 62 shown in FIG. 10, and a Q1 buffer 72 and a Q2 buffer 73 are provided in place of the Q buffer 67 shown in FIG. 10. Moreover, a T1 buffer 74 and a T2 buffer 75 are provided in place of the T buffer 63 shown in FIG. 10, and an M1 buffer 76 and an M2 buffer 77 are provided in place of the M buffer 64 shown in FIG. 10. In addition, a T-J1 buffer 78 and a T-J2 buffer 79 are provided in place of the T-J buffer 65 shown in FIG. 10, and an M-J1 buffer 80 and an M-J2 buffer 81 are provided in place of the M-J buffer 66 shown in FIG. 10. That is, as shown in FIG. 23, all the image buffers are doubled. With the configuration of the SDRAM 19, the four steps described with reference to FIG. 22 can overlap with one other perfectly. Incidentally, each step includes smaller sub-steps which are executed sequentially.

In execution of image capturing in the high-speed continuous capturing mode described above, outputting of an image signal corresponding to one frame of the latest still image from the CCD 11 is performed in parallel with image processing (post-processing) of a previous frame performed by the post-processing part 31. Accordingly, a quick view image or a thumbnail image corresponding to one frame of the latest still image cannot be generated in parallel with the outputting of the image signal from the CCD 11. Therefore, in execution of image capturing in the high-speed continuous capturing mode, generation of the quick view image and the thumbnail image is not started during outputting of the image signal from the CCD 11. The quick view image and the thumbnail image are generated collectively and subsequently. In this case, the processing time of each step becomes longer than that in image capturing in a single capturing mode but the total processing time can be shortened because new frames are captured successively. When it is difficult to provided doubled image buffers as shown in FIG. 23 in terms of memory capacity, etc., at least the R buffer may be doubled (as an R1 buffer 68 and an R2 buffer 69) so that image capturing of the next frame can be continued.

An example of combination of the aforementioned processes will be described finally. When the CCD 11 is configured so that the reading mode can be switched in accordance with whether one field contains all color signal components (R, G and B) or not, processing modes corresponding to the respective cases may be provided so that one of the processing modes selected in accordance with switching of the reading mode can be executed. That is, configuration may be made so that a quick view image and a thumbnail image are generated from image data of one field when one field contains all color signal components (R, G and B), whereas a quick view image and a thumbnail image are generated from image data of two or more fields when one field does not contain all color image components (R, G and B). With this configuration, optimum processing can be performed regardless of the configuration of the CCD 11, the number of fields to be read and the switching of the reading mode.

As described above, according to this embodiment, generation of a low-resolution image is started in the reading period of remaining one(s) of all fields except part of the fields. Accordingly, the reading time from the image sensor can be used efficiently.

Moreover, according to this embodiment, a display unit is further provided for displaying an image for checking a result of capturing as a lower-resolution image when the image is generated. Accordingly, the waiting time of the user can be shortened.

Moreover, according to this embodiment, a field selecting unit for selecting one of fields is further provided so that a color image of one field selected by the field selecting unit to generate a low-resolution image is transferred from the pre-processing part to the post-processing part directly to thereby unify pre-processing and post-processing. Accordingly, the low-resolution image can be generated efficiently and quickly.

Moreover, according to this embodiment, a first low-resolution image and a second low-resolution image are generated in such a manner that the field selecting unit selects either of a field used for generating the first image and a field used for generating the second image. Accordingly, low-resolution images can be generated sequentially and quickly without necessity of adding any special configuration.

Moreover, according to this embodiment, for generation of low-resolution images, a first image with a low resolution is generated by the post-processing part and directly transferred from the post-processing part to the image averaging part to thereby simultaneously generate a second image with a lower resolution than that of the first image. Accordingly, low-resolution images can be generated efficiently and quickly.

Moreover, according to this embodiment, for generation of the low-resolution images, the white balance adjusting part performs white balance adjustment in accordance with a white balance adjustment value decided in advance. Accordingly, low-resolution images can be generated quickly while white balance adjustment can be performed appropriately.

Moreover, according to this embodiment, a high-speed continuous capturing mode is provided so that generation of any low-resolution image is not started in the reading period of the remaining fields during execution of image capturing in the high-speed continuous capturing mode. Accordingly, the reading time from the image sensor can be used efficiently regardless of the image capturing mode.

Although the respective sub-steps are drawn in the timing charts of FIGS. 12A to 12D and FIGS. 18A and 18B so as to have equalized lengths for the sake of simplification in the aforementioned embodiment, the lengths of the respective sub-steps have no correlation with actual processing lengths. Generally, the processing time required for processing such as image processing, JPEG compression processing, data recording, etc. is proportional to the amount of data used for the processing. That is, the longest processing time is required for generation and JPEG compression processing of the main image compared with generation of the quick view image and the thumbnail image. With respect to JPEG compression, the longest time is required for compression of the main image. Accordingly, the three sub-steps of image processing (post-processing), JPEG compression processing and data recording are dedicated to processing of the main image so that reduction of the image capturing time can be achieved. As described above in this embodiment, generation of the quick view image and the thumbnail image can be quickened to thereby achieve reduction of the image capturing time.

When the quick view image which was heretofore used only for checking image capturing is JPEG-compressed and recorded on the memory card 23 while associated with the main image, the quick view image can be displayed on the LCD 21 at the time of reproduction of the main image. As a result, in comparison with the case where the main image was heretofore size-reduced before displayed on the LCD 21, the waiting time of the user can be shortened in this case. In this case, JPEG compression processing may be applied to the quick view image as well as the main image. A private area (maker note area) of Exif/DCF can be used for recording the quick view image.

In JPEG compression processing, bit rate control has been heretofore made to keep the size of data of one frame almost constant. The bit rate control can keep the number of image capturing frames constant in accordance with the recording capacity of the memory card 23. There is however some case where JPEG compression must be repeated several times under the bit rate control, so that the image capturing time may become remarkably long. It is therefore desired that the amount of data is brought close to a target value while the number of times in repetition of compression is reduced as sufficiently as possible. On this occasion, the number of times in repetition of compression can be reduced when a quantization table for JPEG compression of the main image is decided with reference to information concerned with JPEG compression of the quick view image or the thumbnail image generated before the main image.

In each of the above-described embodiments, in the case of using an image signal having minimum number of fields (for example, 2 fields in the embodiment) which can extract color information of all the colors in the CCD to generate low-resolution images such as quick view images. However, the present invention is not limited to such an example. The number of the fields of the image signal which is used for generating low-resolution images may be any numbers as long as the number of the fields of the image signal is more than the number of the minimum fields but less than the number of all fields of the CCD.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image capturing apparatus comprising:
    an image-capturing unit that is configured to (i) capture image data, (ii) separate the image data having a plurality of color components into a plurality of fields, and (iii) output each of the plurality of fields, the image-capturing unit being switchable between a first mode and a second mode, outputting of the image data including only some of the plurality of color components being performed per-field in the first mode, and outputting of the image data including all of the plurality of color components being performed per-field in the second mode;
    a selecting unit that is configured to select two or more, but not all, of the plurality of fields, from among the plurality of fields, so to contain all of the plurality of color components when the image-capturing unit is switched to the first mode, and is configured to select one field from among the plurality of fields when the image-capturing unit is switched to the second mode;
    an image-generating unit that is configured to generate a low-resolution image based on image data of a field being selected by the selecting unit; and
    a controlling unit that is configured to cause the image-generating unit to generate the low-resolution image.

2. The image capturing apparatus according to claim 1, wherein
    the image-capturing unit is configured to generate a thumbnail image that is different from the low-resolution image, by applying a resolution conversion to the low-resolution image.

3. The image capturing apparatus according to claim 2, wherein
    the low-resolution image is an image to be displayed on a display apparatus.

4. The image capturing apparatus according to claim 2, wherein
    the image generating unit is configured to generate a main image that is different from the low-resolution image and the thumbnail image based on the image data separated into the plurality of fields and output by the image-capturing unit.

5. The image capturing apparatus according to claim 4, further comprising:
    a record-controlling unit that is configured to record an image file into a recording medium, the image file including at least the thumbnail image and the main image.

6. The image capturing apparatus according to claim 1, wherein
    in the first mode, the image data having the plurality of color components is separated into at least four even-numbered fields and each of the fields is output.

7. The image capturing apparatus according to claim 1, wherein
    a color filter in a Bayer arrangement is disposed in the image-capturing unit.

8. The image capturing apparatus according to claim 1, wherein
    the selecting unit selects, from among the plurality of fields, a smallest number of fields necessary to contain all of the plurality of color components when the image-capturing unit is switched to the first mode.

9. The image capturing apparatus according to claim 1, wherein:
    when the image-capturing unit is switched to the first mode, the controlling unit controls the image data of the field selected by the selecting unit to be stored in a buffer and controls the image-generating unit to read the image data stored in the buffer while the image-capturing unit outputs a field other than the field selected by the selecting unit, and
    when the image-capturing unit is switched to the second mode, the controlling unit controls the image data of the field selected by the selecting unit to be transmitted to the image-generating unit directly.

10. The image capturing apparatus according to claim 9, wherein:
    when the image-capturing unit is switched to the second mode, the controlling unit controls the image-generating unit to generate the low-resolution image while the image-capturing unit outputs the field selected by the selecting unit.

* * * * *